US012000951B2

United States Patent
Arbabian et al.

(10) Patent No.: US 12,000,951 B2
(45) Date of Patent: Jun. 4, 2024

(54) ROBUST RADAR-CENTRIC PERCEPTION SYSTEM

(71) Applicant: Plato Systems, Inc., San Carlos, CA (US)

(72) Inventors: Mohammad Amin Arbabian, San Francisco, CA (US); Upamanyu Madhow, Santa Barbara, CA (US); Babak Mamandipoor, Burlingame, CA (US)

(73) Assignee: Plato Systems, Inc., San Carlos, CA (US)

( * ) Notice: Subject to any disclaimer, the term of this patent is extended or adjusted under 35 U.S.C. 154(b) by 556 days.

(21) Appl. No.: 17/256,544

(22) PCT Filed: Jun. 28, 2019

(86) PCT No.: PCT/US2019/040015
§ 371 (c)(1),
(2) Date: Dec. 28, 2020

(87) PCT Pub. No.: WO2020/006533
PCT Pub. Date: Jan. 2, 2020

(65) Prior Publication Data
US 2021/0124011 A1 Apr. 29, 2021

Related U.S. Application Data

(60) Provisional application No. 62/763,745, filed on Jun. 28, 2018.

(51) Int. Cl.
*G01S 7/295* (2006.01)
*G01S 13/58* (2006.01)
(Continued)

(52) U.S. Cl.
CPC ............ *G01S 7/295* (2013.01); *G01S 13/867* (2013.01); *G01S 13/878* (2013.01);
(Continued)

(58) Field of Classification Search
None
See application file for complete search history.

(56) References Cited

U.S. PATENT DOCUMENTS

| 6,771,208 B2 | 8/2004 | Lutter et al. |
| 6,873,251 B2 | 3/2005 | Schiffmann et al. |

(Continued)

FOREIGN PATENT DOCUMENTS

| DE | 102010024328 A1 | 12/2011 |
| DE | 102013021568 A1 | 6/2015 |

(Continued)

OTHER PUBLICATIONS

"International Application Serial No. PCT/US2019/040013, International Search Report mailed Oct. 8, 2019", 3 pgs.

(Continued)

*Primary Examiner* — Whitney Moore
(74) *Attorney, Agent, or Firm* — Schwegman Lundberg & Woessner, P.A.

(57) ABSTRACT

A radar data acquisition circuit comprising: a radar receiver to receive radar data representing a radar scene in response to a sequence of extended sampling waveform frames that includes multiple sampling waveform subframes; and a first processor; configured with stored program instructions to generate one or more replacement sampling waveform subframes to include in an extended sampling waveform frame of the sequence based at least in part upon one or more radar parameters of radar data received using the sequence of extended sampling waveform frames.

33 Claims, 25 Drawing Sheets

(51) Int. Cl.
*G01S 13/86* (2006.01)
*G01S 13/87* (2006.01)
*G01S 13/931* (2020.01)

(52) U.S. Cl.
CPC .......... *G01S 13/582* (2013.01); *G01S 13/931* (2013.01); *G01S 2013/93271* (2020.01); *G01S 2013/93275* (2020.01); *G01S 2013/93276* (2020.01)

(56) References Cited

U.S. PATENT DOCUMENTS

| | | | |
|---|---|---|---|
| 9,423,498 | B1 | 8/2016 | Brown |
| 9,547,078 | B2 | 1/2017 | Kuehnle et al. |
| 11,885,906 | B2 | 1/2024 | Arbabian et al. |
| 2007/0152870 | A1 | 7/2007 | Woodington et al. |
| 2008/0024353 | A1 | 1/2008 | Schneider |
| 2011/0199254 | A1 | 8/2011 | Bishop et al. |
| 2012/0105268 | A1 | 5/2012 | Smits et al. |
| 2014/0152502 | A1 | 6/2014 | Nishikata et al. |
| 2015/0192668 | A1 | 7/2015 | Mckitterick |
| 2016/0003938 | A1 | 1/2016 | Gazit et al. |
| 2016/0195614 | A1 | 7/2016 | Tabrikian et al. |
| 2017/0307735 | A1 | 10/2017 | Rohani et al. |
| 2017/0307746 | A1 | 10/2017 | Rohani et al. |
| 2018/0203455 | A1 | 7/2018 | Cronin et al. |
| 2018/0284265 | A1* | 10/2018 | Bilik ................ G01S 13/931 |
| 2019/0293756 | A1* | 9/2019 | Blaes ................ G01S 7/4972 |
| 2019/0377965 | A1* | 12/2019 | Totolos, Jr. ............. G06N 3/045 |
| 2021/0156990 | A1 | 5/2021 | Madhow et al. |

FOREIGN PATENT DOCUMENTS

| | | |
|---|---|---|
| DE | 102015012812 A1 | 4/2017 |
| DE | 102016221947 A1 | 5/2018 |
| DE | 102016224573 A1 | 6/2018 |
| WO | WO-2016003474 A1 | 1/2016 |
| WO | WO-2020006531 A1 | 1/2020 |
| WO | WO-2020006533 A1 | 1/2020 |

OTHER PUBLICATIONS

"International Application Serial No. PCT/US2019/040013, Written Opinion mailed Oct. 8, 2019", 9 pgs.

"International Application Serial No. PCT/US2019/040015, International Search Report mailed Sep. 24, 2019", 4 pgs.

"International Application Serial No. PCT/US2019/040015, Written Opinion mailed Sep. 24, 2019", 8 pgs.

"U.S. Appl. No. 17/256,564, 312 Amendment filed Dec. 7, 2023", 11 pgs.

"U.S. Appl. No. 17/256,564, Corrected Notice of Allowability mailed Sep. 25, 2023", 2 pgs.

"U.S. Appl. No. 17/256,564, Notice of Allowance mailed Sep. 8, 2023", 11 pgs.

"International Application Serial No. PCT/US2019/040013, International Preliminary Report on Patentability mailed Jan. 7, 2021", 11 pgs.

"International Application Serial No. PCT/US2019/040015, International Preliminary Report on Patentability mailed Jan. 7, 2021", 10 pgs.

"U.S. Appl. No. 17/256,564, PTO Response to Rule 312 Communication mailed Dec. 26, 2023", 2 pgs.

Shu, Haining, "Data Fusion in a Multi Target Radar Sensor Network", IEEE Radio and Wireless Symposium, (2007), 4 pgs.

Yan, Junkun, "Benefit Analysis of Data Fusion for Target Tracking in Multiple Radar System", IEEE Sensors Journal, vol. 16, No. 16,, (Aug. 15, 2016), 8 pgs.

Yu, Xu, "Several Methods of Radar Data Fusion", 3rd International Symposium on Electromagnetic Compatibility, (2002), 4 pgs.

* cited by examiner

ROBUST RADAR-CENTRIC PERCEPTION SYSTEM

CROSS-REFERENCE TO RELATED APPLICATIONS

The present application is a U.S. National Stage Filing under 35 U.S.C. 371 from International Application No. PCT/US2019/040015, filed on Jun. 28, 2019, and published as WO 2020/006533 on Jan. 2, 2020, which application claims the benefit of U.S. Provisional Patent Application, Ser. No. 62/763,745, filed Jun. 28, 2018, entitled, "Methods and Apparatus for Robust Radar-Centric Perception System", which is expressly incorporated herein in its entirety by this reference.

BACKGROUND

Existing advanced autonomy for mobile platforms typically relies heavily on Light Detection and Ranging (LIDAR) systems, which typically provide a high-resolution point cloud representation of the scene. However, LIDAR can be vulnerable to impairments such as fog, snow and rain. Radar, which operates at much larger wavelengths than light, is far more robust to such impairments. However, for a given form factor, a radar unit often provides poorer resolution than LIDAR, since angular resolution depends on the aperture divided by the wavelength.

There has been a need for a radar-centric system with a form factor suitable for autonomy and with improved angular resolution, as well as overall efficacy of perception.

BRIEF DESCRIPTION OF DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals and/or letters in the various examples. This repetition is for simplicity and clarity and does not in itself dictate a relationship between the various embodiments and/or configurations discussed.

DETAILED DESCRIPTION

Introduction

A radar-centric perception system 100 and method are provided. An example machine-based radar-centric perception system includes one or more radar sensor units that include radar elements and a radar fusion unit to provide multi-scale data acquisition and processing. The example machine-based perception system is broadly applicable to a range of applications and scenarios, including various autonomous systems and vehicles, as well as for advanced driver-assist (e.g., ADAS) capabilities deployed in the automotive industry, for example. While the system and method are applicable to a wide range of scenarios involving mobile platforms, such as on-road, on-water, and aerial vehicles, for example, the following description is focused primarily on perception for on-road vehicles. As used herein 'perception' refers to developing a real-time understanding of the environment around a mobile platform (e.g., car, boat, aerial drone, robot), such as the relative position and velocity of objects, as well as classification of these objects. For an on-road vehicle, many of the objects of interest are capable of motion, such as pedestrians, bicycles, and other vehicles, for example. Objects of interest that are stationary can include road features, curbs, highway barriers, and buildings, for example.

System Architecture

Figure 1A:
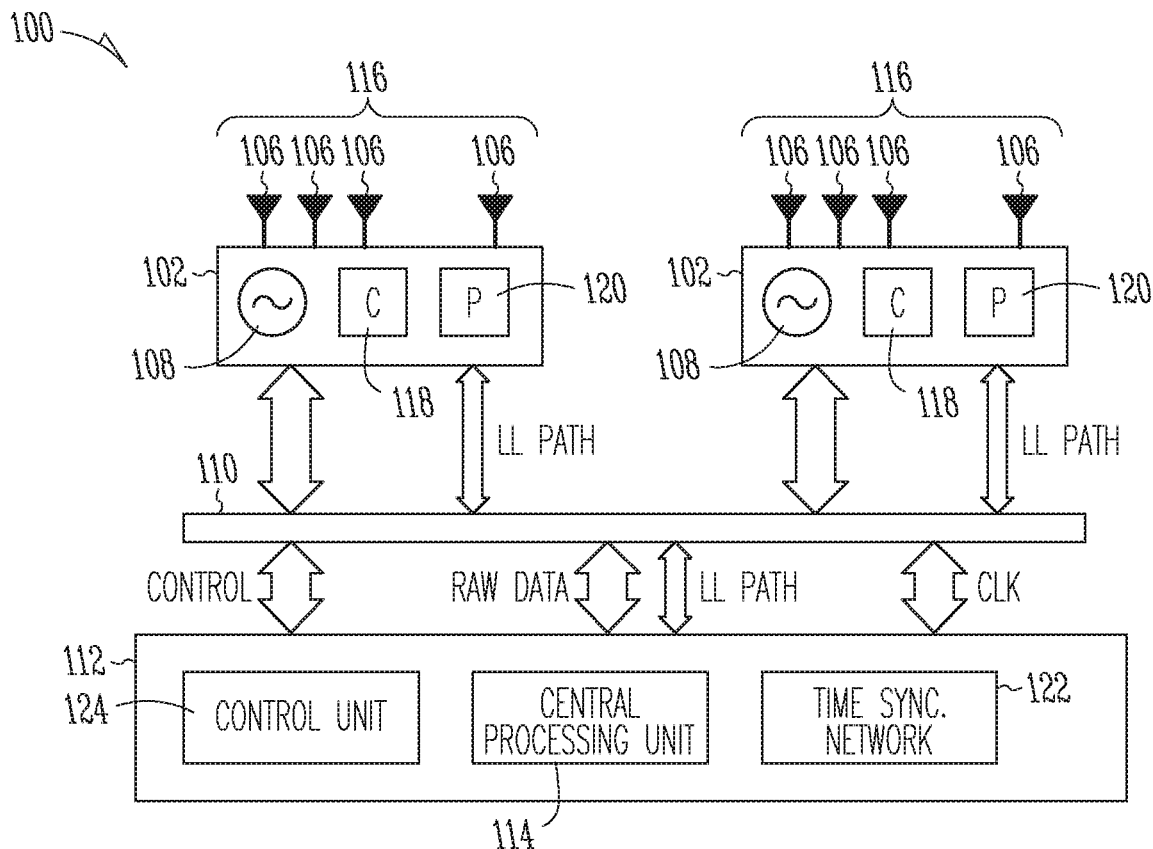
FIG. 1A is an illustrative first architecture level block diagram showing certain components of an example radar-centric perception system.

FIG. 1A is an illustrative first architecture level block diagram showing certain components of an example radar-centric perception system 100. The example radar-centric perception system, also referred to herein as the 'perception system', includes multiple distributed radar sensor units 102 suitable for mounting at different locations on a moving or stationary platform (e.g., vehicle, drone, robot, etc.), which are capable of adjusting their data acquisition and measurement procedures. The perception system 100 includes multiple radar sensor units 102 each including a radar element that includes an antenna array 116 that includes one or more radar antennas 106 and a local oscillator 108. The perception system includes a fusion circuit block 112, also referred to herein as a 'fusion block'. The perception system 100 includes a communication network 110 operably coupled to provide communication between the radar sensor units 102 and the fusion block 112. The network 110 includes control, data and timing (clock) signal lines to operably couple the multiple radar sensor units 102 to the fusion block 112. Individual radar sensor units 102 include processing circuitry 116 to perform local inference concerning objects within their individual radar and vision sensor fields of view based at least in part upon radar signal information received at their local locations on a platform. The fusion block 112 includes processing circuitry 114 to perform centralized inferencing about objects within a wide radar aperture produced based upon combined radar information received from the smaller radar apertures associated with the multiple radar sensor units 102. A single radar unit can have an aperture of a few centimeters, while the effective aperture created by multiple coordinating radar units deployed on a vehicle can span 1-3 meters. Individual radar sensor units 102 can operate autonomously with the fusion block 112 or in concert with each other through the fusion block 112.

Figure 1B:
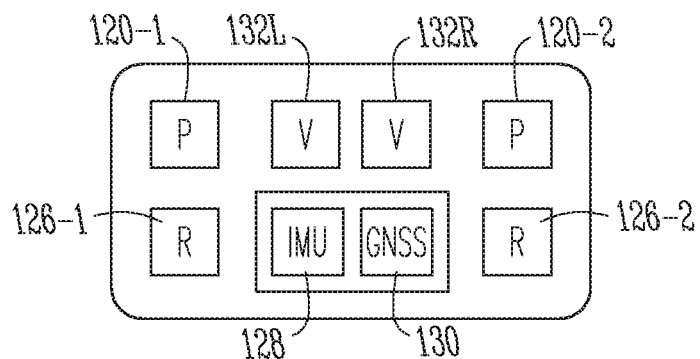
FIG. 1B is an illustrative block diagram showing multiple sensors of an example radar sensor unit that includes radar units and supplemental sensors.

FIG. 1B is an illustrative block diagram showing multiple sensors of an example radar sensor unit 102 that includes radar elements and supplemental sensors. The example radar sensor elements include two MIMO radar elements (denoted by R) 126-1, 126-2, two processors (denoted by P) 120-1, 120-2 an inertial measurement unit (IMU) 128 and a global navigation satellite system (GNSS) unit 130, and stereo vision sensor that includes a left monocular camera 132L and a right monocular camera 132R (each monocular camera is denoted by V). The IMU and GNSS sensors 128, 130 operate in concert to provide precise global location for the radar sensor unit 102. Position of a radar sensor unit 102 relative to a platform on which it is mounted can vary by small amounts relative due to vibration, for example. The stereoscopic vision sensor 132L, 132R can be mounted to share a vision field of view with the radar fields of view of the radar elements 126-1, 126-2. An example vision system 132L, 132R is operably coupled to one or more of the processors 120-1, 120-2 to provide a classifier trained through machine learning, for example, to classify different objects (e.g., person, bicycle, car). The example vision system 132L, 132R is operably coupled to one or more of the processors 120-1, 120-2 to provide bounding boxes that can be used to detect salient objects within a radar field of view of the radar elements 126-1, 126-2.

Figure 2:
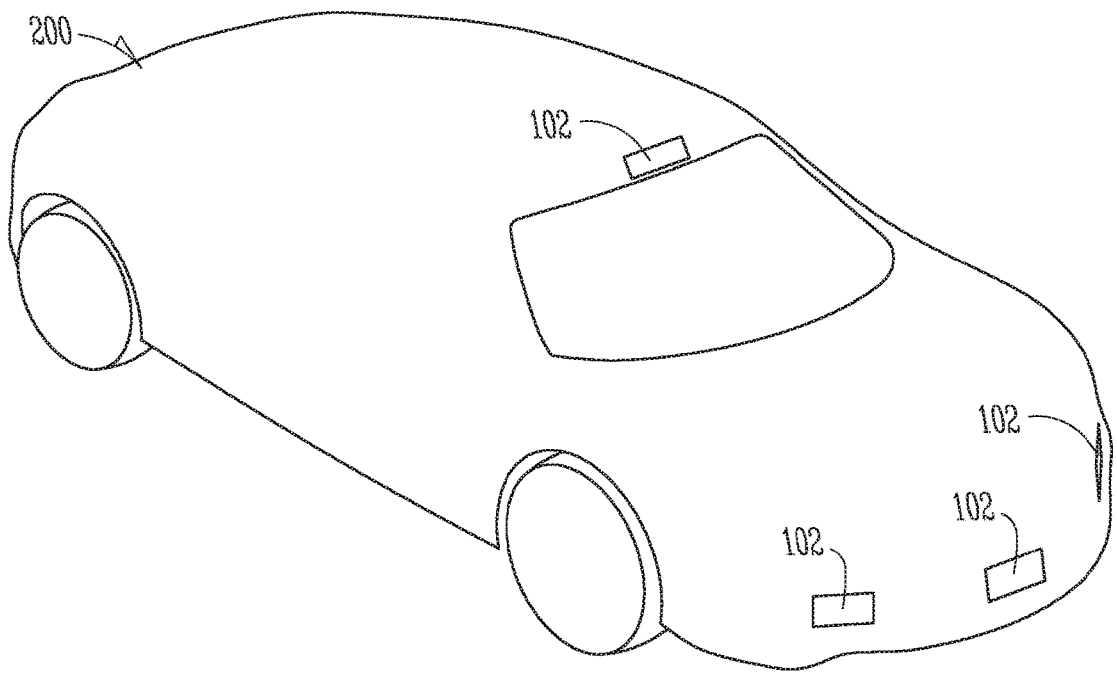
FIG. 2 is an illustrative drawing showing a perspective view of a deployment of multiple radar sensor units on a front portion of an automobile platform.
Figure 3:
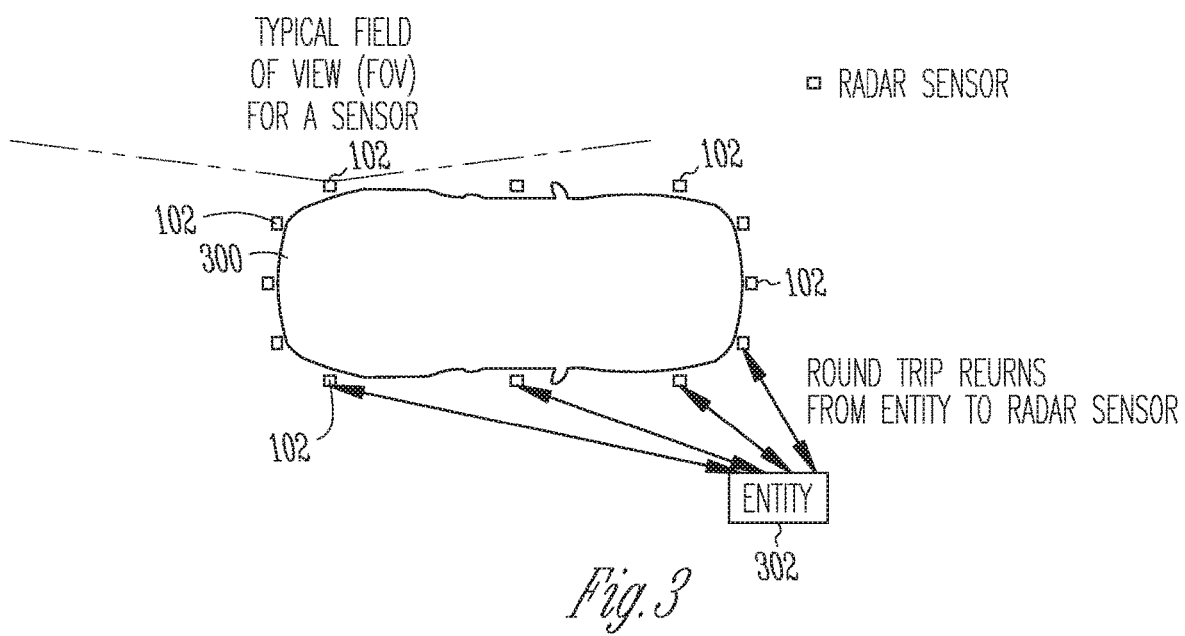
FIG. 3 is an illustrative block diagram representing a top view of an automobile platform with radar sensor units mounted along its sides, front, and back portions and showing an object located within the radar fields of view of multiple radar sensor units.

FIG. 2 is an illustrative drawing showing a perspective view of a first example deployment of multiple radar sensor units 102 mounted on a front portion of a first automobile platform 200. FIG. 3 is an illustrative block diagram representing a top view of a second automobile platform 300 with radar sensor units 102 mounted along its sides, front, and back portions and showing an object 302 located within the radar fields of view of multiple radar sensor units 102. A fusion block 112 associated with the second platform 300 synthesizes a large effective aperture based upon radar data collected by radar sensor units 102 distributed about the platform. Example radar sensor units are operably coupled to each other and/or to the fusion block by a communication network 110. Each sensor unit has a radar field of view. Some example radar senor units are co-located with vision sensors (not shown) to assist in identification and classification of potential targets of interest. In the example second platform 300 shown in FIG. 3, multiple radar sensor units detect the object 302. Roundtrip radar signal returns 304 between the object and multiple radar sensor units 102 are shown.

Referring again to FIG. 1A, within an example sensor unit 102, an antenna array 116 includes N antenna elements, where N=1, 2, . . . . Individual example antenna elements of a sensor unit can be implemented within a sensor unit as a radar transmitter (Tx) element, radar receiver (Rx) element, or radar transceiver (Tx/Rx) element. The radar elements within an individual example sensor unit share the same clock and LO 108, which act as a radar sampling waveform generator. An Rx element mixes a sampling waveform with a transmitted waveform received at its antenna to produce received radar data. Hence the radar elements of a sensor unit are typically fully synchronized in time/frequency/phase, and are capable of coherent transmission and reception, as is common with phased-array systems, for example. The antenna array 116 within an example sensor unit 102 is not necessarily uniform. For example, the antenna elements in an example multiple input, multiple output (MIMO) radar antenna array can be configured in a sparse, non-uniform fashion. An example sensor unit can include phased-array beamforming capability, depending on the application.

Within an example sensor unit, a processor circuit 118 manages radar data acquisition and measurement by its radar elements. The processor circuit 118 can manage adjustment of one or more of radar waveform parameters (e.g. bandwidth, time duration, chirp slope, frame size and configuration, chirp and frame periodicity, signal combination and averaging, etc.). The processor circuit 118 can manage adjustment of one or more of activation and coordination of antenna elements both in the transmission and reception, for example. The processor circuit 118 can manage adjustment of processing of captured radar information based upon inference tasks assigned to the sensor unit, for example. The processor circuit can adjust feedback provided to other components of the system, for example. Moreover, an example processor circuit 118 can adjust measurement and processing parameters, depending upon application for example, including the scale of the data that is processed. Within an example sensor unit, an example control block 118 controls operation of the individual radar sensor units such as communication of control signals over the network 110 with the fusion block 114, for example.

An example fusion block 112 includes a time synchronization network 122, a control circuit block 124 and a central processing circuit block 114. The time synchronization network 122 provides baseband timing signals to the radar sensor units 102 over the network 110. The control circuit block 124 communicates control commands over the network 110 to the radar sensor units 102 to coordinate their operation. For example, the control circuit block 124 provides command signals to coordinate collection of radar data acquired (both processed and raw data) from each radar sensor unit 102. The processing circuit block 114 processes radar data acquired from the spatially distributed radar sensor units 102 and generates radar-based feedback information.

An example fusion block 112 can be used for multi-mode radar processing. For example, a radar sensor unit 102 can capture radar data. The radar sensor unit 102 that captures the radar data can process the captured radar data according to a first radar data processing mode. Meanwhile, the fusion block 112 processes the same radar data according to a second radar processing mode based on a selection of data sent to it by multiple sensor units 102. In other words, an example fusion block 112 can determine a second radar processing mode based upon the data subsets received from one or more sensor units 102, which themselves can individually process the individual portions of the radar data they receive according to a first radar processing mode, before sending subsets of the radar data they receive to the fusion block 112. Alternatively, in an example perception system 100, different sensor units 102 can use different radar processing modes to process the different portions of the radar data they receive before sending subsets of the data they receive to the fusion block 112. Thus, the same radar data can be processed differently at the sensor units 102 and at the fusion block 112.

An example fusion block 112 can process data captured by multiple radar sensor units to synthesize a large effective radar aperture based upon radar data received from the multiple radar sensor units, each having a smaller radar field of view. For example, consider a fusion block that includes M radar sensor units, M=2, 3, . . . , distributed across a synthesized radar aperture. The aperture can be produced for a stationary or moving platform, e.g., on a vehicle/drone/robot, or any imaging, sensing, perception, or screening system. The fusion circuit block can coordinate and time data gathering by multiple radar sensor units 102 through command signals provided to radar sensor units that are spatially distributed across the aperture.

An example fusion block 112 can evaluate the radar data provided by different radar sensing units to generate radar-processing based inferences for delivery over the network 110 to individual radar sensor units as cues or hints to use as a basis to individually adjust their individual radar data processing. For example, individual radar sensor units 102 can use radar-processing based inferences to adjust selection of radar data subsets to send over the network 110 to the fusion block 112. This has the advantage of significantly reducing the data rates that need to be supported by the network. For example, individual radar sensor units 102 can use radar-processing based inferences to adjust selection of radar sampling waveforms to provide to their LOs 108 for sampling transmitted radar waveforms incident upon antennas 106 of their antenna arrays 116.

Radar Signal Modulation

For simplicity, examples described in this specification use a conventional chirp sampling modulation waveform to describe aspects of an example radar-centric perception system. However, the concepts of coordination, data acquisition and multi-scale processing disclosed herein are applicable to a wide range of radar signal modulation schemes known in the art, including pseudonoise sequences, pulsed transmission, frequency hopping, orthogonal frequency division multiplexing (OFDM), and combinations thereof, for example.

Radar Signal Processing Pipeline

One or more processors 120 of a radar sensor unit 102 are configured using stored program instructions to act as a radar signal processing pipeline to produces local radar data parameters used in radar data subset selection and radar sampling waveform selection described below. An example pipeline produces a data representation that indicates range information, angle information and Doppler frequency (velocity) information for scatterers in the environment. An example receiver pipeline for a MIMO radar operating using a sequence of chirp waveforms employs a 3D Fast Fourier Transform (FFT) circuit to transform the radar data cube to an FFT-processed data representation that indicates range information, angle information and Doppler frequency (velocity) information represented by the radar data cube. A target identification circuit identifies a target object within a field of view of the receiver antenna based upon the FFT-processed data. An example target identification engine includes a Common False Alarm Rate (CFAR)-based point cloud detection block to estimate target detection probability and includes a Doppler filter to reject noise clutter.

Data Cube

Figure 4:
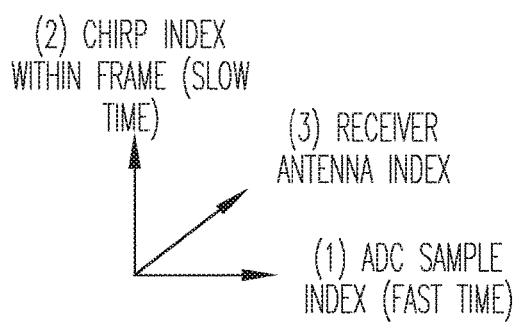
FIG. 4 is an illustrative drawing representing an example radar data cube format.
Figure 4:
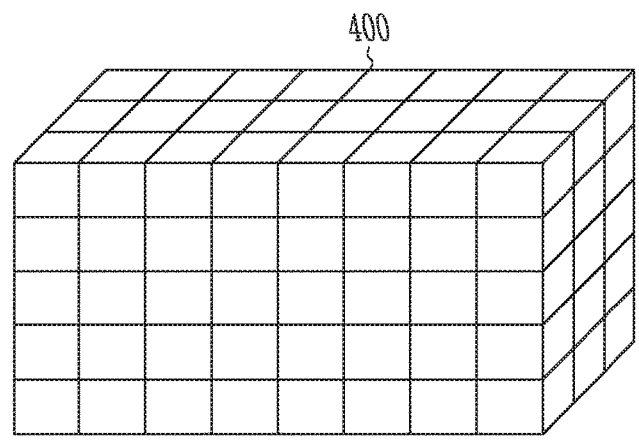

FIG. 4 is an illustrative drawing representing an example radar data cube 400 that can be stored in a computer readable storage medium. A radar data cube is an example arrangement of radar data that is especially well suited to organizing chirp radar data. However, the concepts of organizing and using radar data disclosed herein are applicable to other radar data arrangements. Assume that each radar transmitter of a transmitter element of a sensor unit transmits a sequence of chirps in bursts referred to herein as a 'frame'. The entire data frame received at a receiver antenna array of the sensor unit in response to the transmitted chirp sequence can be represented in a three-dimensional (3D) cube with its dimensions given by (1) ADC sample index, (2) chirp index within a frame, (3) receiver antenna element index. The ADC (analog-to-digital converter) sample index also is commonly referred to as the fast time dimension or the range dimension. Fast time sample intervals, when Fourier transformed and converted to distance using the signal propagation speed, are often referred to as range bins, or range gates. The chirp index within a frame index also is commonly referred to as the slow time dimension, and its Fourier transform yields the Doppler frequency dimension. The term slow time is employed because the sampling interval between samples in the slow time dimension is much longer than the fast-time sample spacing. Processing data in the slow-time dimension allows estimation of the Doppler spectrum at a given range bin. The receiver antennas are spatially separated, and their Fourier transform leads to the angle dimension. Thus, the radar data cube receives received data in fast time, slow time and receiver index, and its 3D FFT leads to a 3D data cube in range, Doppler frequency (convertible to velocity) and angle dimensions.

Multi-Mode Radar Processing, Radar Data Reduction and Radar Sampling Waveform Selection Radar data is processed to extract information relevant to inference objectives. In the automotive vehicle context, example inference objectives include collision avoidance, lane-change assist, blind spot detection, and mission-critical or delay-sensitive detections that may guide fast decision loops, as well as high-resolution imaging to spatially resolve distant objects, or estimating microDoppler signatures to classify detected objects. Different inference objectives can require different choices of radar data processing (locally at each sensor unit 102 as well as at the central fusion block 112, for a system with multiple sensor units 102), radar data selection, and radar sampling waveform selection. The latter may be termed radar processing modes or paths, radar data selection modes, and radar sampling waveform selection (or more succinctly, radar waveform selection) or transmission modes, respectively. Different modes act as mechanisms to achieve different inference objectives. Different modes of radar processing, radar data subset selection, and radar sampling waveform generation are required to support different inference objectives. Different inference objectives can associate with different rules to use radar parameters, radar-based feedback information and sensor-based feedback information to select radar data subsets and radar sampling waveforms.

Overview of Radar Sensor Unit-Based Radar Data Acquisition

Figure 5:
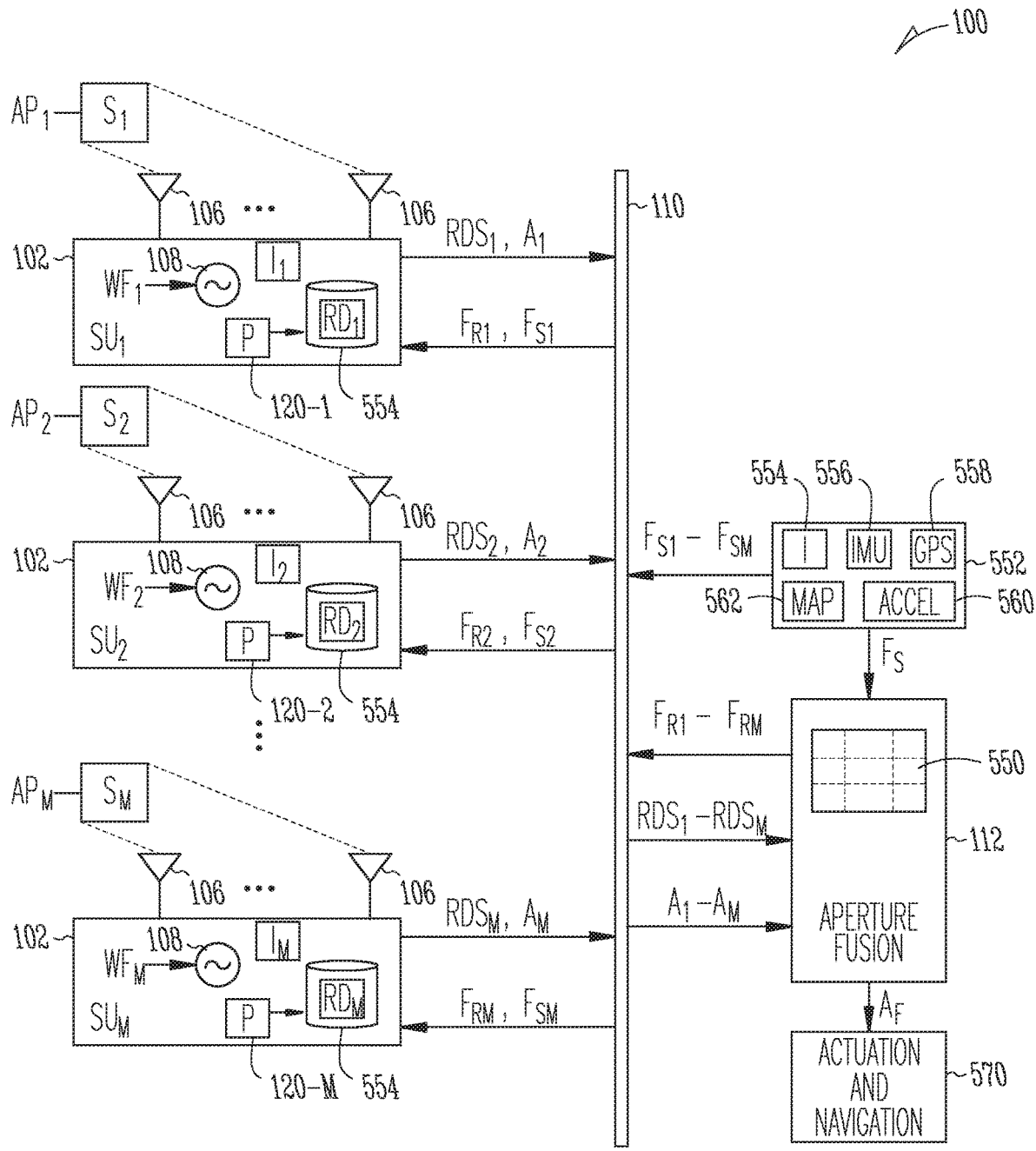
FIG. 5 is an illustrative second architecture-level diagram to illustrate the operation of the perception system of FIG. 1 in provision and use of sampling waveforms, radar data, alerts, and feedback information.

FIG. 5 is an illustrative example second architecture-level diagram to illustrate example operation of the perception system 100 of FIG. 1 in provision and use of radar data, radar data sampling waveforms, radar data subsets, alerts, and feedback information. To simplify and avoid duplication, FIG. 5 omits certain details that are shown and described with reference to FIG. 1. The example perception system 100 includes multiple spatially distributed small aperture sensor units 102 ($SU_1$-$SU_M$), a radar data fusion block 112, and a supplementary sensor block 552. The example perception system 100 is coupled to an actuation and navigation control system 570. The sensor units 102 generate sampling waveforms $WF_1$-$WF_M$, which can differ from one sensor unit 102 to the next, to sample radar signals incident upon on antennas 106 of their respective antenna arrays 116 to receive radar data from within their distributed radar apertures $AP_1$-$AP_M$. The sensor units select radar data subsets $RDS_1$-$RDS_M$, which can differ in type from one radar unit to the next, to send over the network 110 to the fusion block 112. The sensor units 102 can send alerts $A_1$-$A_M$ over the network 110 to the fusion block 112 to indicate events requiring immediate action. In response to receiving an alert from a sensor unit, for example, the fusion block 112 sends a corresponding alert $A_F$ to the actuation and navigation system 570, which can initiate a platform reaction, such as initiating immediate braking action to slow down a vehicle platform in response to an alert that indicates a potential imminent collision, for example. An example fusion sensor block 112 can cooperate with an individual radar sensor unit 102 to provide multi-mode radar processing of radar data captured at the individual radar sensor unit 102. Alternatively, an example fusion block 112 can collectively use the radar data subsets $RDS_1$-$RDS_M$ captured at different the spatially distributed sensor units 102 to produce a wide aperture radar image 550. The fusion block 112 and the supplementary sensors 552 provide respective radar-based feedback information $F_R$ and supplementary sensor-based feedback information $F_S$ to individual sensor units 102 for use to generate the sampling waveforms and to select the radar data subsets. In an alternative example perception system, the individual radar units also can provide feedback information directly to other sensor units over the network.

In an example perception system, each sensor unit 102 includes one or more radar receiver units used to receive radar data representing a radar scene within a local radar aperture of the receiver unit. Each receiver unit includes at least one antenna 106 and LO 108. For example, one or more radar receivers 106, 108 of a first sensor unit SU receive and save within a memory storage device 554, first radar data ($RD_1$) representing a first radar scene ($S_1$) within a first local radar aperture ($AP_1$) of the first one or more receivers 106, 108. One or more radar receivers 106 of a second sensor unit $SU_2$ receive and save within a memory storage device 554, second radar data ($RD_2$) representing a second radar scene ($S_2$) within a second local radar aperture ($AP_2$) of the second one or more receivers. One or more radar receivers 106, 108 of an Mth sensor unit $SU_M$ receive and save within memory storage device 554, Mth radar data ($RD_M$) representing an Mth radar scene ($S_M$) within an Mth local radar aperture ($AP_M$) of the Mth one or more receivers.

In an example perception system 100, each sensor unit 102 includes a configured according to program instructions to act as a radar signal processing pipeline that selects radar data subsets and produces corresponding metadata to indicate content of the selected radar data subsets (e.g., angle, phase, Doppler, or range information) based upon radar data and feedback information that it receives, and each sensor unit sends its selected radar data subsets over the network 110 to the fusion block 112. For example, a first processor 120-1 of the first sensor unit $SU_1$ acts as a first sensor radar data signal processing pipeline to select a first radar data subset ($RDS_1$) and metadata (not shown) based upon the first radar data ($RD_1$), first radar-based feedback information $F_{R1}$ and first supplementary sensor-based feedback information $F_{S1}$. A second processor 120-2 of the second sensor unit $SU_2$ acts as a first sensor radar data signal processing pipeline to select a second radar data subset ($RDS_2$) and metadata (not shown) based at least in part upon the second radar data ($RD_2$), second radar-based feedback information $F_{R2}$ and second supplementary sensor-based feedback information $F_{S2}$. An Mth processor 120-M of the Mth sensor unit $SU_M$ acts as a first sensor radar data signal processing pipeline to select an Mth radar data subset ($RDS_M$) and metadata (not shown) based at least in part upon the Mth radar data ($RD_M$), Mth radar-based feedback information $F_{RM}$ and Mth supplementary sensor-based feedback information $F_{SM}$. In an example perception system 100, the fusion block 112 sends the radar-based feedback information $F_{R1}$-$F_{RM}$ to the sensor units and one or more of the supplementary sensors 552 associated send supplementary sensor-based feedback information $F_{S1}$-$F_{SM}$ to the sensor units $SU_1$-$SU_M$. In another example perception system 100, individual sensor units $SU_1$-$SU_M$ can provide radar-based feedback information to other sensor units and supplementary sensors co-located at distributed locations with individual sensor units can send supplementary sensor feedback information to other sensor units.

In an example perception system 100, individual sensor units 102 can detect potential events requiring urgent attention and can generate and send corresponding alert information over the network to the fusion block to warn of such potential events. For example, the first sensor unit $SU_1$ can generate and send a first alert $A_1$ based upon detecting an event within a corresponding first radar aperture ($AP_1$). The second sensor unit $SU_2$ can generate and send a second alert $A_2$ based upon detecting an event within a corresponding second radar aperture ($AP_2$). The Mth sensor unit $SU_M$ can generate and send an Mth alert $A_M$ based upon detecting an event within an Mth radar a corresponding Mth radar aperture ($AP_M$). In an example perception system 100, alert information can include alert identifying information to identify the type of potential event. In an example perception system, alert information can include a further reduced subset of the radar data associated with the event. In an example perception system, the network includes a low latency path to send alert information from a sensor unit 102 to the fusion block.

In an example perception system 100, each sensor unit 102 generates a sampling waveform to sample a scene within its corresponding radar aperture. The first sensor unit $SU_1$ generates a first sampling waveform ($WF_1$) to sample the first radar scene ($S_1$) within the first local radar aperture ($AP_1$) based at least in part upon one or more of the first radar information ($RD_1$) and the first feedback information $F_{R1}$ and $F_{S1}$. The second sensor unit $SU_2$ generates a second sampling waveform ($WF_2$) to sample the second radar scene ($S_2$) within the second local radar aperture ($AP_2$) based at least in part upon one or more of the second radar information ($RD_2$) and the second feedback information $F_{A2}$ and $F_{S2}$. The Mth sensor unit $SU_M$ generates an Mth sampling waveform ($WF_M$) to sample the Mth radar scene ($S_M$) within the Mth local radar aperture ($AP_M$) based at least in part upon one or more of the Mth radar information ($RD_M$) and the Mth feedback information FAM and $F_{SM}$.

In an example perception system 100, each sensor unit 102 includes an image sensor that has an imaging field of view that overlaps with a radar field of view of the one or more receiver units of the sensor unit. The first sensor unit ($SU_1$) includes a first imaging unit ($I_1$) to produce first image information representing a first visual image (not shown), which is encompassed within the first radar aperture ($AP_1$), and which the first sensor unit $SU_1$ can use to identify and classify objects. The image sensor $I_1$ is coupled to provide a local portion of sensor-based feedback $F_{S1}$ to contribute to radar data subset selection and sampling waveform selection at the first sensor unit $SU_1$ as described below. Similarly, the second sensor unit ($SU_2$) includes a second imaging unit ($I_2$) that is coupled to provide a local portion of sensor feedback $F_{S2}$ to contribute to radar data subset selection and sampling waveform selection at the second sensor unit $SU_2$ as described below. Likewise, the Mth sensor unit ($SU_M$) includes an Mth imaging unit ($I_M$) that is coupled to provide a local portion offsensor feedback $F_{SM}$ to contribute to radar data subset selection and sampling waveform selection at the Mth sensor unit $SU_M$ as described below.

An example fusion block 112 can fuse the radar data subsets received from the individual sensor units 102 to produce a wide radar aperture 550. A larger effective radar aperture 550 provides better angular resolution based upon the radar data subsets received from the smaller radar aperture sensor units, for example.

An example fusion block 112 can evaluate the radar data subsets and metadata received from the individual sensor units to produce the radar-based feedback information $F_{R1}$-$F_{RM}$ and send it over the network 110 to specific sensor units. An example fusion block 112 can be configured to evaluate radar subset information and metadata from the multiple sensor units $SU_1$-$SU_M$. For instance, an example fusion block 112 can determine which different radar sensor units 102 are tracking different targets and which radar sensor units 102 are tracking the same targets and which sensor units 102 are tracking no targets, for example. The fusion unit can send radar-based feedback information to an individual sensor unit that provides a cue as to what to look for or where to look in its local radar apertures based upon one or more radar data subsets and corresponding metadata received over the network 110 from different sensor units. Thus, an example fusion unit can coordinate radar data collection and processing among multiple radar sensor units by using radar data subsets and metadata provided by the multiple sensor units to guide radar search and evaluation by individual sensor units, for example.

An example fusion block 112 can use a first radar data processing mode to process radar data received from an individual radar sensor unit 102 while that radar data sensor unit processes that same radar data using a different radar data processing mode. Thus, the fusion block and an individual radar sensor unit can collaborate to achieve multi-mode processing of radar data.

An example secondary sensor block 552 provides the sensor feedback information $F_S$ to the fusion block 112. The fusion block 112 provides fusion feedback information $F_{FUSE}$ to the sensor block 552 that is indicative of radar data within the fused wide aperture 550. The sensor block 552 includes a vision sensor 555, an inertial measurement unit (IMU) 556, a GPS sensing device 558, an accelerometer 560 and a map system 562. The wide aperture 550 and the image sensor 554 can share a field of view. Sensor block processing circuitry includes an image classifier to classify (e.g., pedestrian, automobile, bicycle) images and to produce bounding boxes about salient object images. An example image sensor is stereoscopic and can estimate distance associated with salient objects. The image sensor block 554 provides sensor feedback information $F_S$ to the fusion block 112 and provides supplementary sensor-based feedback $F_{S1}$-$F_{SM}$ to the sensor units $SU_1$-$SU_M$ to enable for use sensor assisted radar imaging.

Figure 6:
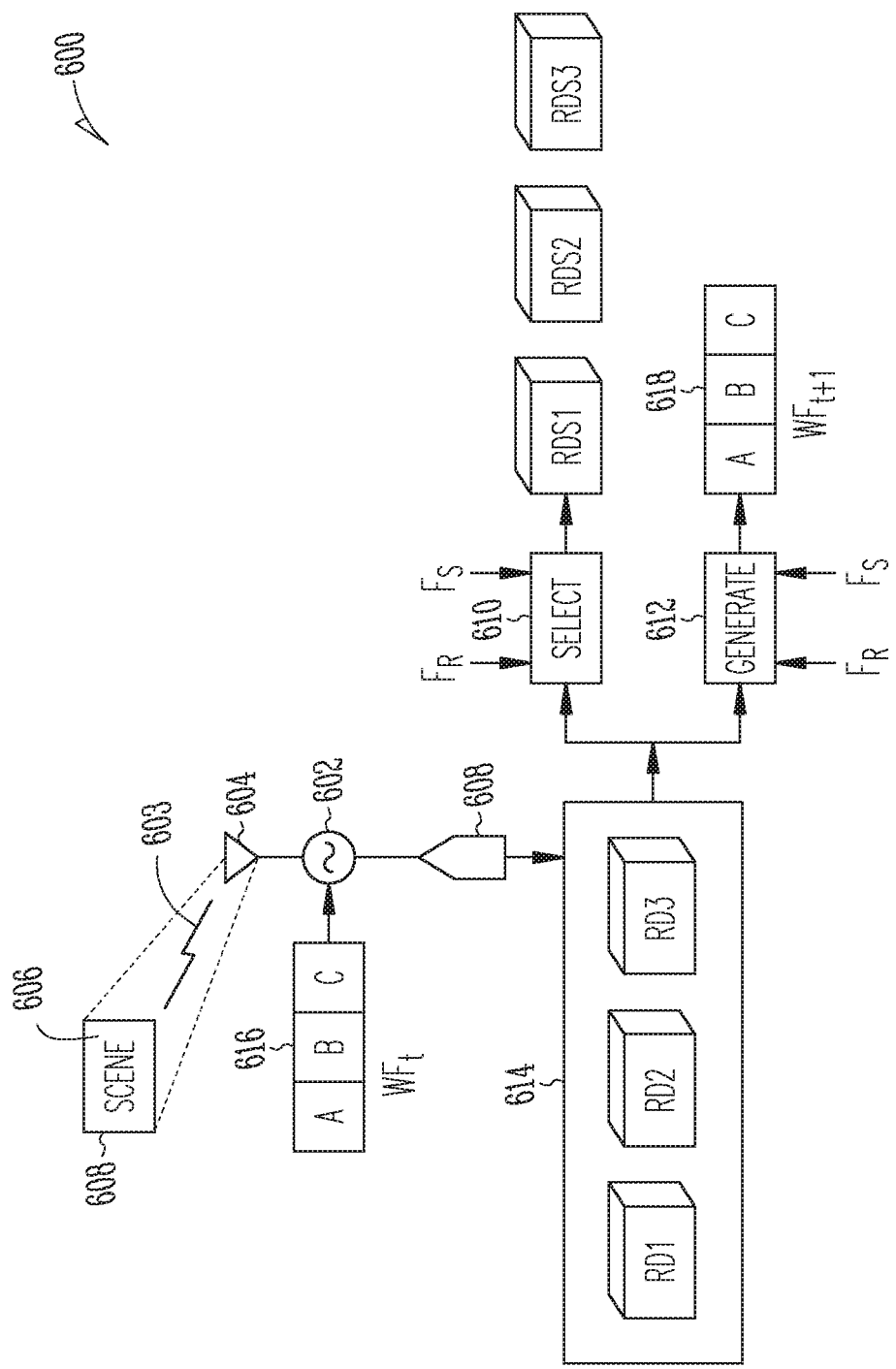
FIG. 6 is an illustrative block diagram showing an example radar data subset selection circuit block and an example sampling waveform generation circuit block of an example radar sensor unit of FIG. 5.

Overview of Radar Sensor-Unit Based Radar Data Subset Selection and Radar Sensor-Unit Based Radar Sampling Waveform Generation FIG. 6 is an illustrative block diagram showing an example radar data subset selection circuit block 610 and an example sampling waveform generation circuit block 612 of an example radar sensor unit 102 of FIG. 5. A radar sensor unit-based processor 120 is configured with program instructions to implement the radar data subset selection circuit block 610 having an inference mode to select data subsets based upon one or more radar data-based inference objectives. The radar sensor unit-based processor is configured with program instructions to implement the waveform generation circuit block 612 having an inference mode to generate sampling waveforms based upon one or more radar data-based inference objectives. An adaptive sampling waveform $WF_t$ frame 616, which includes multiple sampling waveform subframes A, B, C, is provided to a LO 602 of the radar sensor unit 102 to sample a radar waveform 603 incident upon a receiver antenna 604 at an example sampling time interval 't'. The incident waveform 603 contains information indicative of a radar scene 606 within a local radar aperture 608 of the radar antenna 604. Analog to digital conversion (ADC) circuitry 608 converts the waveform 603 sampled at time interval 't' to a digital representation. The data subset data selection circuit block 610 selects subsets of radar data 612 sampled at time interval 't' to send to the fusion block 112 (not shown). Multiple different sets of radar data, RD1, RD2, RD3, are sampled and saved in a memory storage device 614 during the example time interval 't' using the different radar sampling waveform subframes (A, B, C). The data subset data selection circuit block 610 selects corresponding radar data subsets RDS1, RDS2, RDS3. The radar waveform generation circuit block 612 generates a subsequent radar sampling waveform $WF_{t+1}$ frame 618 that includes subframes A, B, D, for use to sample a radar waveform 603 during a subsequent sampling time interval 't+1'. One or more of multiple sampling subframes of the subsequent radar sampling waveform $WF_{t+1}$ is different (e.g., subframe D) from the subframes of the earlier radar sampling waveform $WF_t$.

Figure 7:
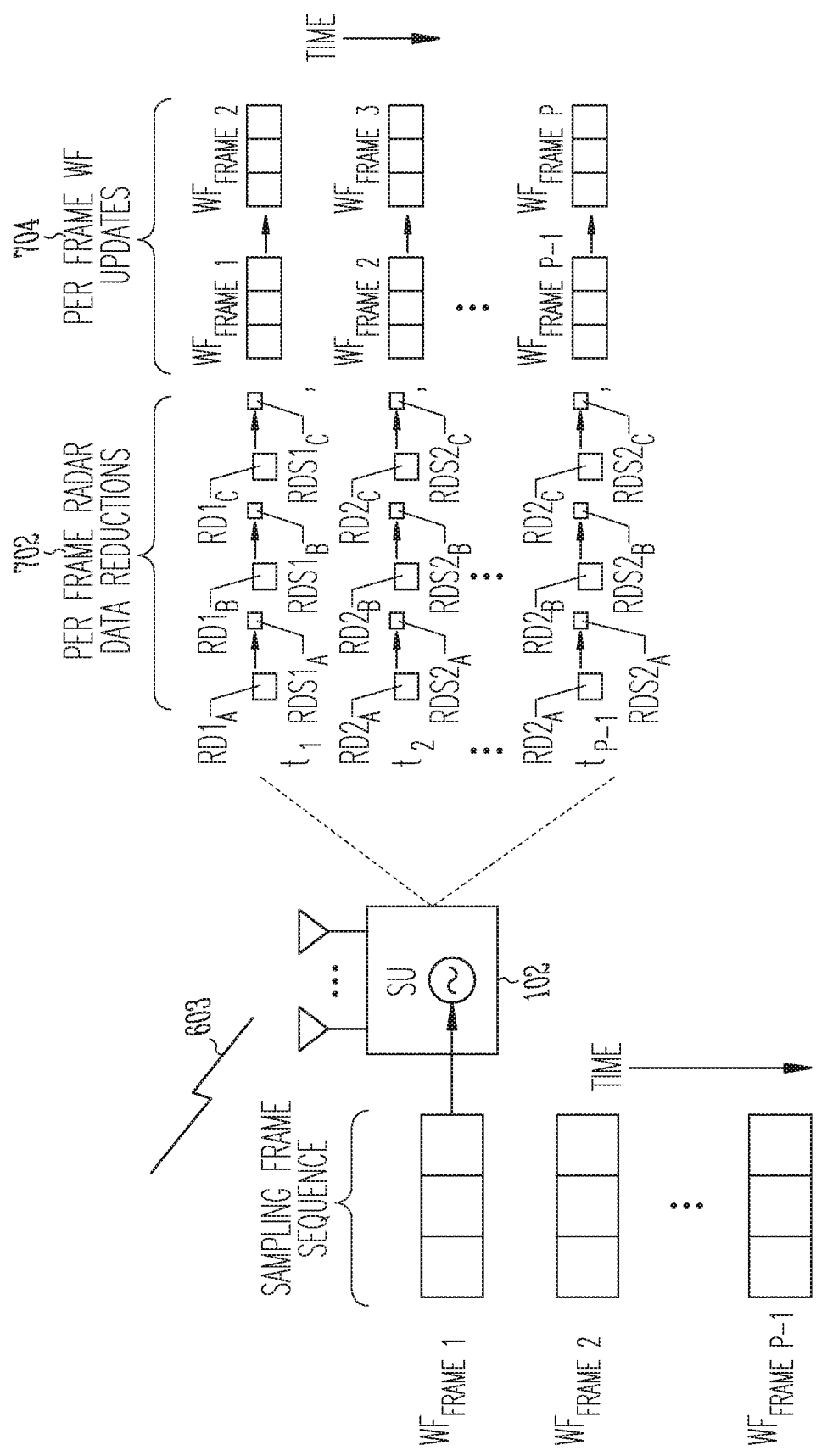
FIG. 7 is an illustrative block diagram representing an example sequence of radar data subset selections and a corresponding example of a sequence of sampling waveform generations at an example sensor unit.

FIG. 7 is an illustrative block diagram representing an example sequence of radar data subset selections 702 and a corresponding example sequence of sampling waveform generations 704 at an example radar sensor unit 102. Over a sequence of time intervals, the radar sensor unit 102 samples an incident radar waveform 603 based upon a sequence of waveform frames: 'frame1' to 'framep'. In the example, during a first sampling time interval 't', the sensor unit uses a first sampling WF 'frame', which includes multiple subframes, to receive a sequence of three radar data cubes $RD1_A$, $RD1_B$, and $RD1_C$, uses a data selection circuit block 610 shown in FIG. 6 to select corresponding radar data subsets $RDS1_A$, $RDS1_B$ and $RDS1_C$ of the received radar data cubes, and sends the radar data subsets over the network to the fusion block 112. Also, during the first time interval '$t_1$', the radar sensor unit 102 uses the radar waveform generation circuit block 612 shown in FIG. 6 to generate a second sampling WF frame2 based upon the radar data collect at time $t_1$ or earlier. Continuing with the example, during a second sampling time interval '$t_2$', the radar sensor unit 102 uses a second sampling WF 'frame2', which includes multiple subframes, to receive three radar data cubes $RD2_A$, $RD2_B$, and $RD2_C$, uses the data selection circuit block 610 to select corresponding radar data subsets $RDS2_A$, $RDS2_B$ and $RDS2_C$ of the received radar data cubes, and sends the radar data subsets over the network to the fusion block 112. Also, during the second time interval '$t_2$', the sensor unit 102 uses a radar waveform generation circuit block 612 to generate a third sampling WF frame3 based upon radar data received at time $t_2$ or earlier. Continuing with the example, during a p−1th sampling time interval '$t_{p-1}$', the sensor unit 102 uses a p−1 sampling WF 'framep-1', which includes multiple subframes, to receive three radar data cubes $RDp-1_A$, $RDp-1_B$, and $RDp-1_C$, uses the data selection circuit block 610 to select corresponding radar data subsets $RDSp-1_A$, $RDSp-1_B$ and $RDSp-1_C$ of the received radar data cubes, and sends the radar data subsets over the network to the fusion block 112. Also, during the p−1th time interval '$t_{p-1}$', the sensor unit 102 uses a radar waveform generation circuit block 612 to generate a pth sampling WF framep based upon radar data received at time $t_{p-1}$ or earlier.

Different ones of the received radar data can be received using from different subframes of a given frame. For example, $RD1_A$, can be received by sampling an incident waveform 603 using one subframe of frame1, and $RD1_B$, can be received by sampling the incident waveform 603 using a different subframe of frame1. Alternatively, for example, $RD1_A$, $RD1_B$ can be received by sampling the incident waveform 603 using one subframe of frame1 and $RD1_C$ can be received by sampling the incident waveform 603 using one subframe of frame1. As yet another alternative example, all three of $RD1_A$, $RD1_B$, and $RD1_C$, can be received by sampling the incident waveform 603 using different subframes of frame. Moreover, as explained below, the frames, e.g., frame1, frame2 can be related in that a later frame can be produced by replacing a subframe in a previous frame with a new subframe. Thus, some corresponding subframes of a sequence of extended frames can match while others can be different. Furthermore, the same frame can be used over the course of multiple time intervals. For example, frame1, frame2 and frame 3 can be the same or can be different over multiple time intervals depending upon whether a new subframe is added to one or both of frame2 or frame3.

Radar Data Subset Selection

Figure 8A:
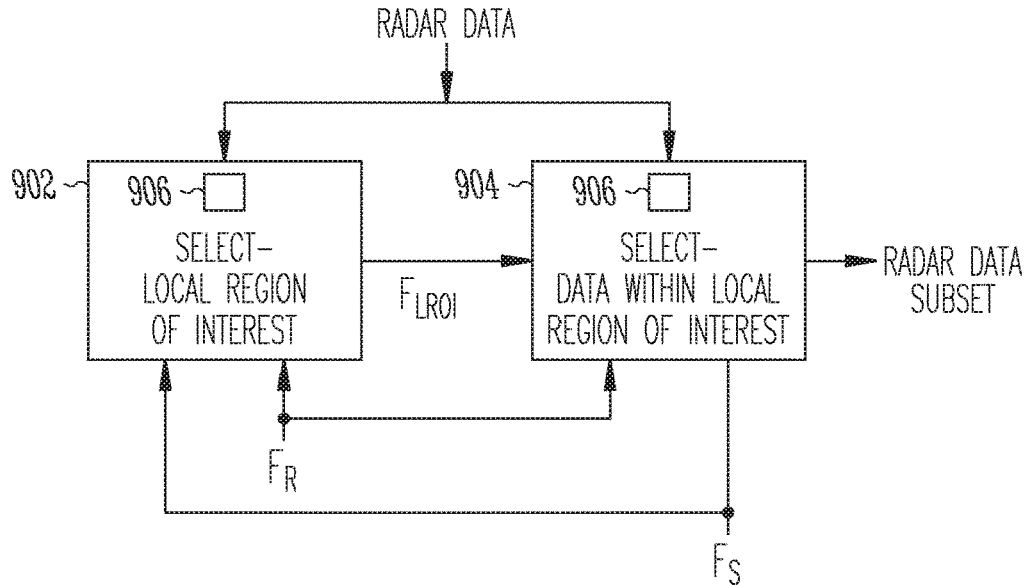
FIG. 8A is an illustrative block diagram showing certain details of the radar data subset selection circuit block of FIG. 6.

FIG. 8A is an illustrative block diagram showing certain details of the radar data subset selection circuit block 610 of FIG. 6. The radar data selection block 610 includes a first selection block 902 to infer a local region of interest (ROI) within received radar data and a second selection block 904 to select data within the selected local ROI. The first selection block 902 is referred to herein as an 'ROI selection block' 902. The second block 904 is referred to herein as an 'ROI data selection' block 904. The ROI selection block 902 receives as input the received radar data, radar-based feedback information $F_R$ provided by the fusion block 112 and supplementary sensor-based feedback information $F_S$ provided by central sensor block 552 or by supplementary sensors co-located with the selection circuit 610, and provides as output, local feedback information $F_{LROI}$ indicating a selected ROI within the received radar data. The ROI selection block 902 selects an ROI based upon one or more rules associated with the one or more inference objectives. The ROI data selection block 904 receives as input radar data, radar-based feedback information $F_R$ and supplementary sensor-based feedback information $F_S$, and provides as output, a radar data subset to send over the network to the fusion block 112. The ROI data selection block 904 selects an ROI data based upon one or more rules associated with the one or more inference objectives. As explained below, the $F_R$ information the $F_S$ information provide hints as to where to look within the received radar data for ROIs and where to look within the ROI for radar data that is of interest.

Figure 8B:
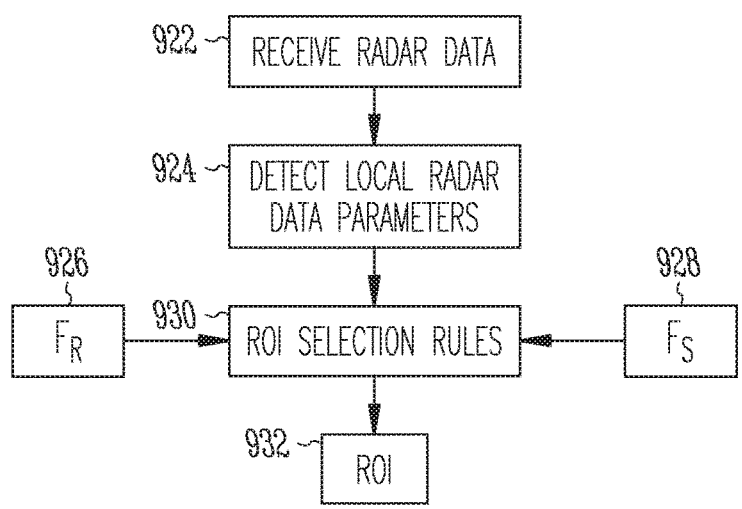
FIG. 8B is an illustrative flow diagram representing a process to infer a radar data region of interest.
Figure 22:
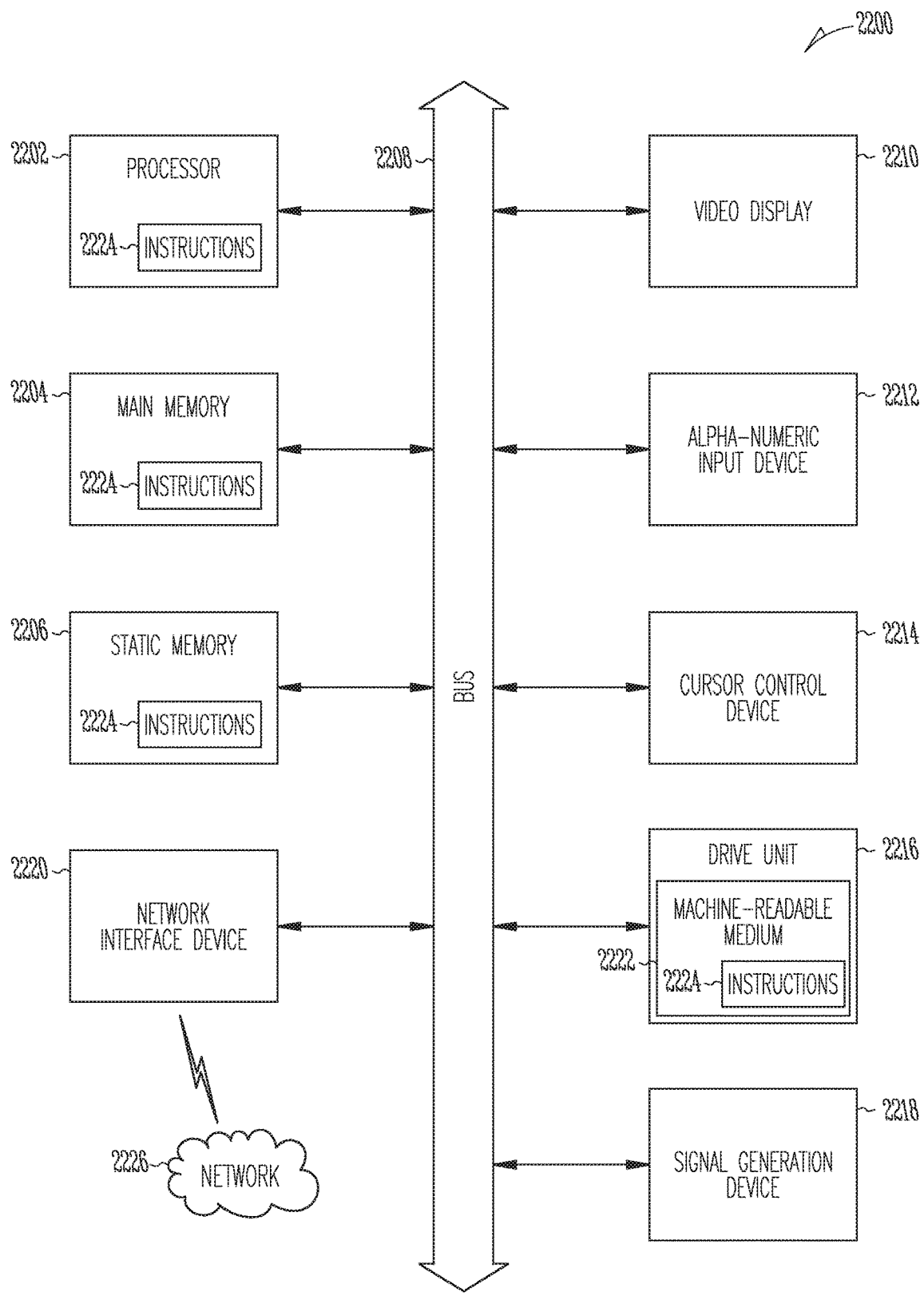
FIG. 22 is an illustrative block diagram of a computer processing system in which to implement the radar sensor units and the fusion block

FIG. 8B is an illustrative flow diagram representing a process 920 to infer a radar data region of interest. The process 920 is performed using the ROI selection block 902. The processor circuit 2202 of FIG. 22 is configured according to stored program instructions 2224 to select a radar data subset according to the process 920. At step 922, radar data is received at the local ROI selection block 902. At step, 924, a local radar signal processing pipeline portion 906 detects values of local radar parameters to be used in support of an inference objective. As used herein the term 'radar parameter' refers to a quantity estimated from the received data. Different inference objectives require use of different radar parameters. For example, depending upon the inference objective, potential ROIs can be detected based upon radar parameters along the range, angle or Doppler dimensions, which are higher than the noise floor by predefined or clutter-adaptive thresholds. Such ROIs are typically determined in the transform domain (i.e., range, Doppler, angle), since these dimensions are closely related to physical parameters of salient objects such as position and velocity. However, the ROI may consist of data that is only partially transformed: for example, a 1D Fourier transform in fast time for a chirp waveform can be used to determine range-based ROIs, but Fourier transforms along the other dimensions (slow time and receive elements) may not be performed when selecting data corresponding to the ROI. ROIs may also be determined by thresholding along the Doppler dimension (which requires Fourier transform across slow time for chirp waveform) to detect objects exhibiting substantial motion relative to the radar platform. Alternatively, for example, radar parameters of a locally received radar data can be used, for example, to detect potentially significant ROIs, in either the original domain (fast time, slow time, and receive antennas for chirp waveforms) or transformed domain (range, Doppler, angle). At step 926, the radar-based feedback information $F_R$ is received over the network 110 from the fusion block 112. The radar-based feedback information $F_R$ can include information indicating one or more targets being tracked by another sensor unit, for example, or indicating information about an ROI identified by another sensor unit, for example. At step 928, the supplementary sensor-based feedback information $F_S$ is received. For example, the $F_S$ information can include image sensor information that provides bounding box $F_S$ information to indicate potential ROIs that are tracked by a central vision sensor 554, by a vision sensor co-located with the data selection block 610, or by a vision sensor located at a different radar sensor unit, for example. Alternatively, for example, a GPS 552 sensor operably coupled to an IMU sensor 556 can be used in concert with map information provided by a map unit 562 to provide $F_S$ information indicative of landmark objects such as signs or bridges, for example. At step 930, one or more local ROI inference rules associated with an inference objective can be used to select a local ROI based upon one or more of a determined local radar parameter, radar-based feedback information $F_R$, and supplementary sensor-based feedback information $F_S$. At step 932, the local feedback information $F_L$ indicating a locally selected ROI is provided as output. An ROI can be expressed in terms of one or more of a range and Doppler angle, for example.

Figure 8C:
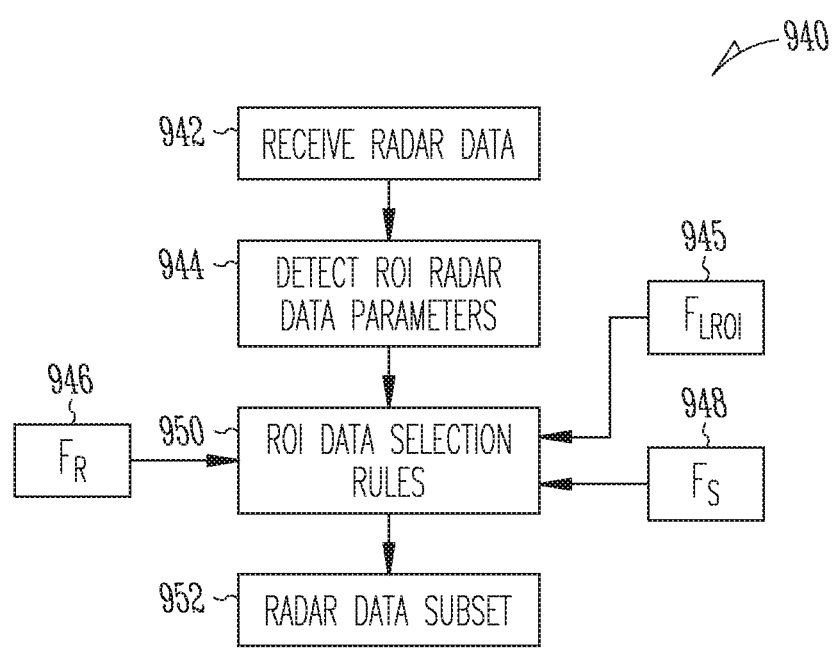
FIG. 8C is an illustrative flow diagram representing a process to select data from within a selected radar data region of interest.

FIG. 8C is an illustrative flow diagram representing a process 940 to select radar data from within a region of interest. The process 940 is performed using the ROI data selection block 904. The processor circuit 2202 of FIG. 22 is configured according to stored program instructions 2224 to select radar data from with the radar data ROI according to the process 940. At step 942, radar data is received at the ROI data selection block 904. At step, 944, the local radar signal processing pipeline 906 determines local radar parameters to be used in support of the inference objective. At step 945, the feedback information $F_{LROI}$ is received. At step 946, radar-based feedback information $F_R$ is received. At step 948, supplementary sensor-based feedback information $F_S$ is received. At step 950, one or more ROI data selection rules associated with an inference objective can be used to select ROI data based upon one or more of the determined local radar parameters, received radar-based feedback information $F_R$, and received supplementary sensor-based feedback information $F_S$. At step 952, the radar data subset is provided as output.

Figure 9:
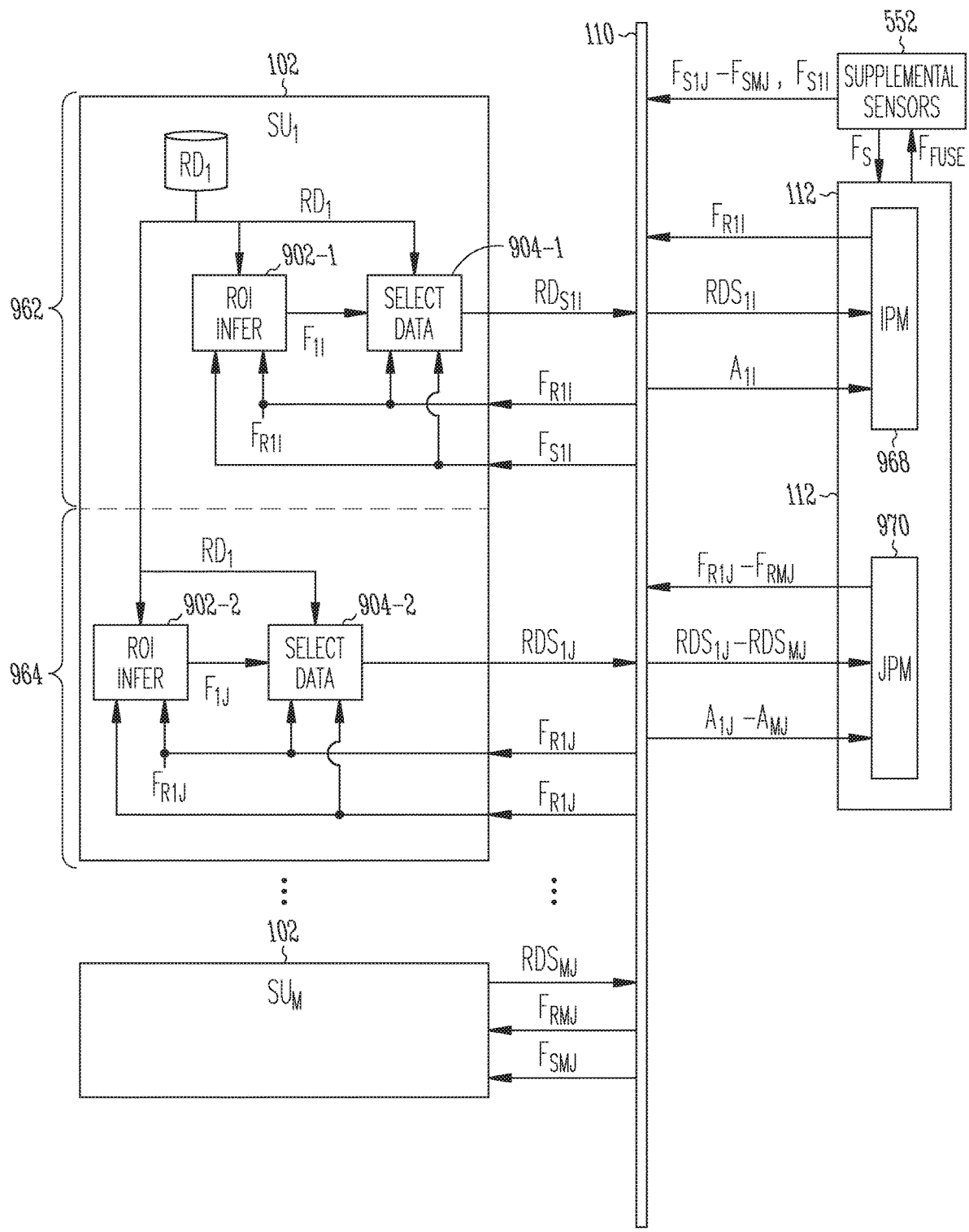
FIG. 9 is an illustrative third architecture-level diagram to explain an example operation of the perception system of FIG. 1.

FIG. 9 is an illustrative third architecture-level diagram to explain an example operation of the perception system 100 of FIG. 1. The system 100 includes radar sensor units 102 ($SU_1$-$SU_M$). Certain details of radar sensor unit $SU_1$ are shown in detail. More particularly, the example radar sensor unit $SU_1$ includes a first radar data subset selection circuit block 962 and a second radar data subset selection circuit block 964. A dashed line 966 demarcates a boundary between the two circuits 962, 964. Processing circuitry 114 of the fusion block 112 is configured using stored program instructions 2224 to implement an individual processing fusion block (IFB) 968 to individually process radar data subsets $RDS_{II}$ provided by the first radar data subset selection circuit block 962, which is operably coupled to the IFB 668. Processing circuitry 114 of the fusion block 112 is configured using stored program instructions 2224 to implement a joint fusion block (JFB) 970 to jointly process radar data subsets $RDS_{S1J}$-$RDS_{SMJ}$ provided by the second radar data subset selection circuit block 964 of the first radar sensor unit $SU_1$ and by respective radar data selection blocks (not shown) of respective second to Mth radar sensor units $SU_2$ to $SU_{M2}$.

The first radar data subset selection circuit block 962 of the first radar sensor unit $RS_1$ includes an ROI selection block 902-1 and an ROI data selection block 904-1. The ROI selection block 902-1 and the ROI data selection block 904-1 are operably coupled to receive first radar data $RD_1$. The ROI data selection block 904-1 is operably coupled to provide first radar data subset for individual processing $RDS_{II}$ to the IFB 968. The ROI selection block 902-1 and the ROI data selection block 904-1 also are operably coupled to receive individual radar-based feedback information $F_{RII}$ from the IFB 968. The ROI selection block 902-1 and the ROI data selection block 904-1 also are operably coupled to receive first sensor-based feedback information $FS_1$. Operation of the first radar data subset selection circuit block 962 will be understood from the explanation above with reference to FIGS. 8A-8C.

The second radar data subset selection circuit block 964 of the first radar sensor unit $RS_1$ includes an ROI selection block 902-2 and an ROI data selection block 904-2. The ROI selection block 902-2 and the ROI data selection block 904-2 are operably coupled to receive the first radar data $RD_1$. The ROI data selection block 904-2 is operably coupled to provide first radar data subset for joint processing $RDS_{IJ}$ to the JFB 970. The ROI selection block 902-2 and the ROI data selection block 904-2 also are operably coupled to receive first joint radar-based feedback information $F_{RIJ}$ from the IFB 968. The ROI selection block 902-1 and the ROI data selection block 904-1 also are operably coupled to receive first sensor-based feedback information $FS_1$. The radar sensor units $SU_2$ (not shown) to $SU_M$ are similarly coupled for joint processing of their respective radar data summaries $RDS_2$ (not shown) to $RDS_M$. Operation of the second radar data subset selection circuit block 964 will be understood from the explanation above with reference to FIGS. 8A-8C.

Figure 10:
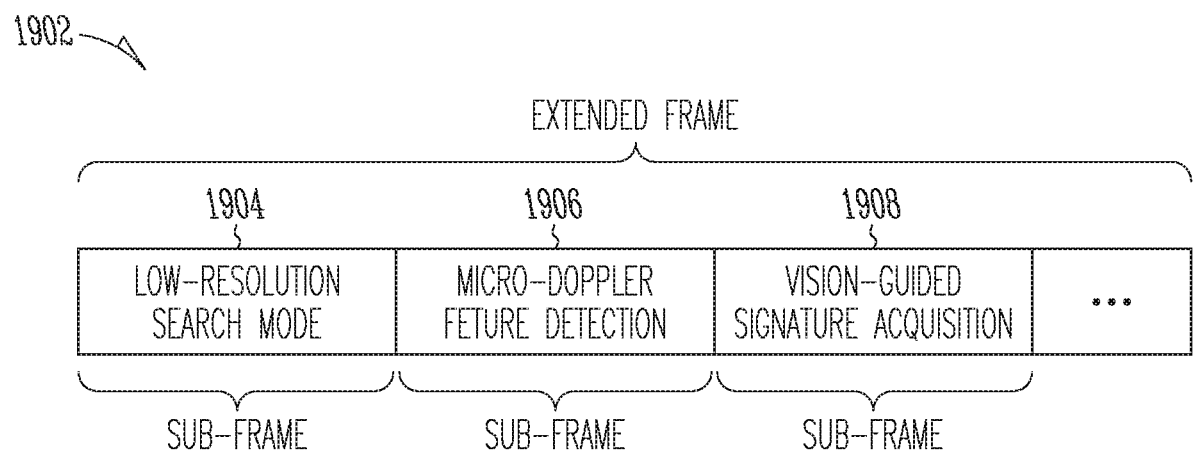
FIG. 10 is an illustrative example extended waveform frame that includes multiple subframes.

Radar Sampling Waveform Selection FIG. 10 is an illustrative example extended waveform frame 1902 that includes multiple subframes. The example extended frame 1902 includes multiple subframes 1904, 1906, 1908, each tailored for a different task. The example extended frame 1902 includes a low-resolution search mode (for initial target acquisition) subframe 1904, a sensor image/vision-guided attention subframe 1906, which for example, focuses a transmitted waveform on a certain spatial region where an object is expected to be located based on the output of a computer vision system), a micro-Doppler feature acquisition subframe 1904, etc. The perception system 100 adapts fixed or variable-length extended frames 1902 to provide broad situational awareness in search mode as well as tracking/locationing/focused modes for specific features or events. This "focusing" can take place in any of the domains (e.g. Doppler, Range, Cross-Range), depending on the inference mode of interest.

An example sampling waveform frame has a time duration that is short enough to make frequent observations of a radar data for a scene and long enough to derive useful information from the radar data in scenarios where and targets objects can be moving at a relatively fast rate, target objects within a radar scene can change frequently, and the platform also can be moving. For example, in an automobile platform there can be a need to make frequent quick decisions about potential obstacles and whether to brake or swerve, for example. An example waveform has a time duration in a range of approximately 100 micro-seconds to 50 milliseconds, and preferably in a range of about 100 micro-seconds to 100 milliseconds.

For example, an example sensor unit can use a 20 millisecond (ms) frame for a refresh rate of 50 Hz. During the 20 ms frame the sensor unit utilizes a variety of pulse sequences, as seen described above, to perform one or more of 1) provide new information on scene changes; 2) use previous cues to focus on subsets of data that are of interest; and 3) track objects.

An example low resolution search mode is assigned a 10 ms window to provide low to medium range resolution (e.g. with lower RF bandwidth) on entire field of view, as well as range/Doppler domains. A waveform used in a search mode is selected. An example search mode employs standard MIMO radar operating at moderate range resolution, with transmitters taking turns sending, and using a moderate bandwidth (e.g., 1 GHz). The remaining 10 ms can be used to cover an adaptable range of scenarios, including but not limited to focus on areas of interest (in spatial and/or Doppler domains), track objects in vicinity, driven by other events of interest, provide enhanced range resolution to objects that reside in closer proximity and/or in the collision path, provide high-resolution inputs requested by the motion-planning and actuation unit (e.g. provide high resolution image in the proximity of the vehicle for sharp turns or other decisions made by an actuation unit).

Figure 11A:
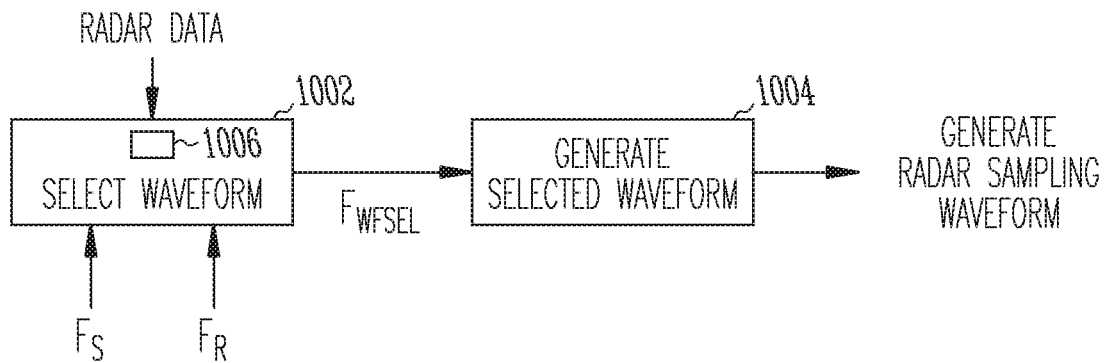
FIG. 11A is an illustrative block diagram showing details of the sampling waveform generation circuit block of FIG. 6.

FIG. 11A is an illustrative block diagram showing details of the sampling waveform generation circuit block 612 of FIG. 6. The sampling waveform generation circuit block 612 includes a third selection block 1002 to select a sampling waveform and a fourth selection block 1004 to generate the selected sampling waveform. The third selection block 1002 is referred to herein as a sampling waveform selection block 1002. The fourth block 1004 is referred to herein as a sampling waveform generation block 1004. The sampling waveform selection block 1002 receives as input the radar data, radar-based feedback information $F_R$ and supplementary sensor-based feedback information $F_S$, and provides as output, local feedback information $F_{WFsel}$ indicating a selected sampling waveform. The sampling waveform selection block 1002 selects a waveform based upon one or more rules associated with one or more inference objectives. The sampling waveform generation block 1004 receives as input the local feedback information $F_{WFsel}$ and provides as output, a radar sampling waveform for provision to a LO of radar sensor unit 102 for subsequent radar signal sampling. The sampling waveform generation block 1004 generates a waveform based upon one or more rules associated with one or more inference objectives. Different rules can be used to generate different waveforms based upon the desired inference mode, which in an example perception system 100, can depend on the information gathered by the system thus far.

Figure 11B:
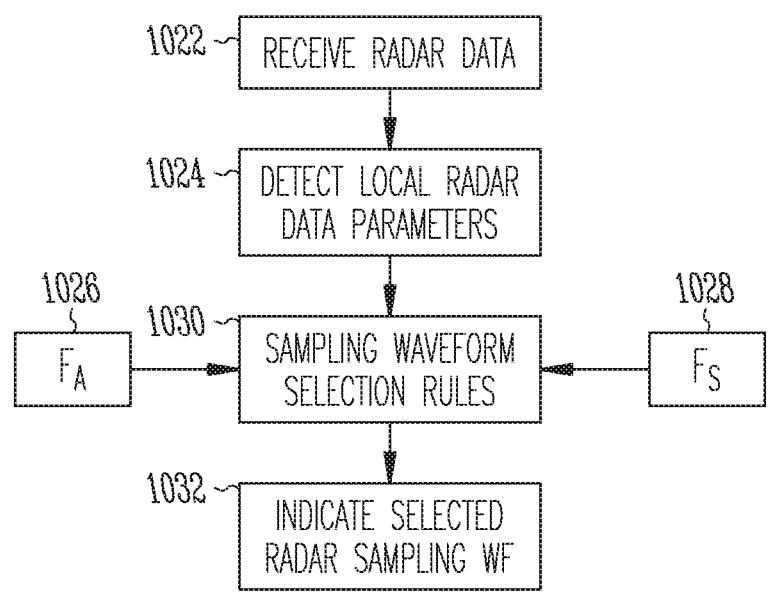
FIG. 11B is an illustrative flow diagram representing a process 1 to select and generate a sampling radar waveform.

FIG. 11B is an illustrative flow diagram representing a process 1020 to select and generate a sampling radar waveform. The process 1020 is performed using the sampling waveform selection block 1002. The processor circuit 2202 of FIG. 22 is configured according to instructions 2224 to select a radar sampling waveform according to the process 1020. At step 1022, radar data is received at the sampling waveform selection block 1002. At step, 1024, a local radar signal processing pipeline portion detects values of local data parameters to be used in support of an inference objective. At step 1026, the radar-based feedback information $F_R$ is received from the fusion block 112. At step 1028, the supplementary sensor-based feedback information $F_S$ is received. At step 1030, one or more sampling waveform inference rules associated with an inference objective can be used to select a radar sampling waveform based upon one or more of the determined local radar data parameters, the received radar-based feedback information $F_R$, and the received supplementary sensor-based feedback information $F_S$. At step 1032, local feedback information $F_{WFsel}$ indicating a selected radar sampling waveform provided as output.

Figure 11C:
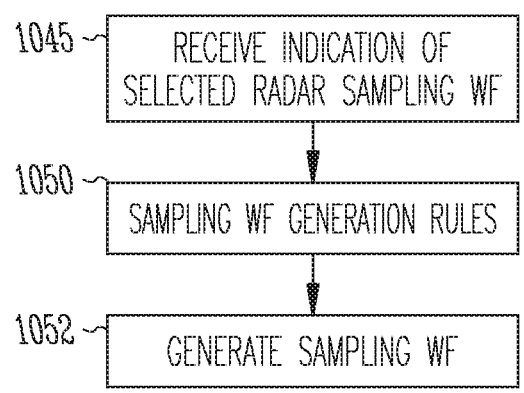
FIG. 11C is an illustrative flow diagram representing a process to generate a selected radar sampling waveform.

FIG. 11C is an illustrative flow diagram representing a process 1040 to generate a selected radar sampling waveform. The process 1040 is performed using the sampling waveform generation block 1004. The processor circuit 2202 of FIG. 23 is configured according to stored program instructions 2224 to generate a radar sampling waveform according to the process 1040. At step 1045, the local feedback information $F_{WFsel}$ indicating the selected radar sampling waveform is received at the sampling waveform generation block 1004. At step 1050, one or more sampling waveform generation rules associated with an inference objective can be used to generate a radar sampling waveform based upon one or more of the local feedback information $F_{WFsel}$. At step 1052, a radar sampling waveform is generated.

Figure 12:
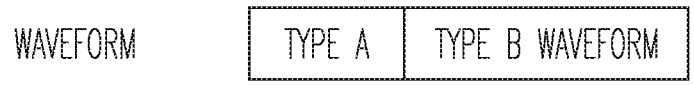
FIG. 12 is an illustrative flow diagram to show an example dynamic transformation of an extended frame over time.
Figure 12:
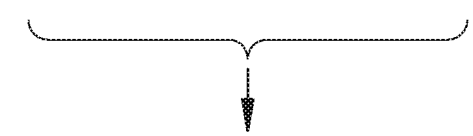
Figure 12:
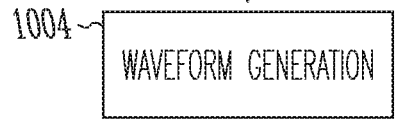
Figure 12:
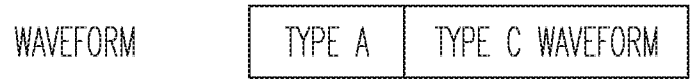
Figure 12:
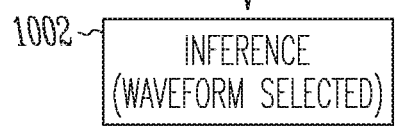
Figure 12:
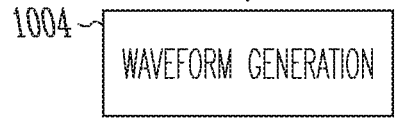
Figure 12:
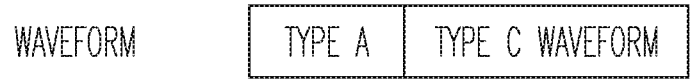

FIG. 12 is an illustrative flow diagram to show an example dynamic transformation of an extended frame over time. The circuit block 612 produces the transition in accordance with the above description of FIGS. 11A-11C. At example time step 1, the extended frame includes a Type A and Type B waveforms. At example time step 2, the inference block 1002 and generation block 1004 cause a selection of a Type C waveform to replace the Type B waveform within a subframe. At example time step 3, the inference block 1002 and generation block 1004 cause a selection of a Type D waveform to replace the Type C waveform within a subframe. Alternatively, for example, the inference block 1002 and the generation block 1004 can cause an additional waveform to be added within an additional subframe without removal of a previous waveform.

The example extended waveform includes search waveform (Type A), supplemented by adaptive waveforms (Types B, C, D), selected using the inference block 1002. An example Type A waveform includes a standard MIMO radar at moderate range resolution, with transmitters taking turns sending, and using a moderate bandwidth (e.g., 1 GHz). This can be used as a baseline search mode for obtaining a radar image of the environment with baseline range-Doppler-angle processing and is also compatible with the timely warning processing path. The baseline search waveform is used, for example, to regularly search for new objects. Other adaptive waveforms can be focused on particular objects or regions of a radar scene. Focused waveforms often are not as well suited for conducting a general search for new objects, for example. A baseline search waveform can be useful for collision avoidance due to objects appearing suddenly, for example.

An example Type B waveform includes includes high-range resolution using a large bandwidth (e.g., 3 GHz) over a shorter duration, in order to quickly focus on a particular range region of interest. Example inference rules used at the inference block 1002 and generation block 1004 cause a selection of a Type B waveform include inference rules to detect of salient objects in coarse range bins corresponding to the search mode which are to be localized more precisely by using better range resolution. The data collected from Type B waveforms from multiple sensors can in addition be processed in high spatial resolution imaging processing path described later to provide improved angular resolution at long ranges.

An example Type C waveform includes a high Doppler and micro-Doppler resolution waveform using a longer duration, and potentially reduced bandwidth (e.g., if the scene is sparse, so that there is little range ambiguity regarding the object of interest) to focus on particular objects. Example inference rules used at the inference block 1002 and generation block 1004 cause a selection of a Type C waveform include inference rules to detect and tracking of a salient object (e.g., using information collected using Type A waveforms in search mode) which we wish to classify (e.g., as pedestrian or bicycle) based on micro-Doppler patterns.

An example Type D waveform uses transmit beamforming to enhance link budget (i.e., all transmitters in a radar module sending the same waveform at the same time, with phases adjusted to form a beam in the desired direction), in order to focus on imaging distant objects. Example inference rules used at the inference block 1002 and generation block 1004 cause a selection of a Type D waveform include inference rules to meet a requirement of increasing the signal-to-noise ratio for confirming detection of salient objects at long ranges.

Overview of Coordination of Centralized Processing with Local Sensor Unit Radar Data Acquisition and Processing Example individual local sensor units 102 of an example perception system 100 have the capability of (1) performing local processing and inference tasks on their locally acquired data and sending radar data subsets and metadata to the fusion block 112 for further centralized processing and/or decision making. Local processing at the sensor units 102 can include the results of detection, tracking, classification, or other local inference tasks; (2) choosing a portion of the acquired raw data (depending on an intended global inference task), applying some preprocessing steps, and sending the pre-processed radar data to the fusion block for central processing; and/or (3) sending raw data to the fusion block 112 for central processing.

Moreover, example individual local sensor units 112 of an example perception system 100 can carry out local processing routines and transferring high-level inference results to the fusion block (some functionalities that might be implemented by in-sensor processing routines include but are not limited to, collision avoidance, lane-change assist, blind spot detection, and mission-critical or delay-sensitive detections that may guide fast decision loops).

Example individual local sensor units 102 can use rules associated with inference tasks as a basis for adjusting properties of their transmission waveforms and corresponding radar sampling waveform frames to capture certain desired information in a radar scene. This may include but is not limited to changing the waveform features (e.g. bandwidth, duration, periodicity, sampling rate, Tx and/or Rx beamforming, etc.) or constructing an extended frame that includes multiple types of waveforms (e.g. in a sequence) to extract multiple types of information from the scene.

Example individual local sensor units 102 can adaptively select only a portion of acquired radar data (before or after some local processing) and transfer that selected portion to the fusion block 112 for central processing.

Example individual local sensor units 102 can receive radar-based feedback information $F_R$ and sensor-based information $F_S$ over the network 110 from the fusion block 112 and the supplementary sensor block 552 (based on radar data in the form of a feedback signal, or cues from other sensing modalities e.g., vision sensors, or due to the change of operation mode of the system) and use the received information to use rules associated with inference tasks to adjust their local processing, waveform properties and modes, and data transfer routines correspondingly.

An example architecture for data transfer and processing is realized based on the following acts:

a) Provide a program instructions to configure blocks 904, 906, 1002, 1004 of sensor units 102 to implement rules for intended inference tasks (including, for example time scale for data acquisition and decision making, and the required resolution/accuracy).

b) Identifying properties of transmission waveforms and corresponding radar sampling waveform frames to capture desired information in a radar scene and have the radar sensor units 102 illuminate the scene accordingly or identify the portion of acquired radar data that are needed for an inference task.

c) Allocating in-sensor unit or centralized processing power (e.g., fusion block 112) to carry out the inference task.

Examples of Coordination of Centralized Processing with Local Sensor Unit Radar Data Acquisition and Processing The following examples involve multi-scale processing in the context of radar sensor units deployed on an automobile. As stated above, the perception system 100 can operate in multiple inference modes, each corresponding to a different inference task. Each mode can require different choices on radar data processing (locally at each sensor unit 102 as well as at the central fusion block 112, for a system with multiple sensor units 102), radar data selection, and radar sampling waveform selection. The latter may be termed radar processing modes or paths, radar data selection modes, and radar sampling waveform selection (or more succinctly, radar waveform selection) or transmission modes, respectively.

(a) Timely warning mode: for example, at a speed of 70 mph (about 30 m/s), the system has less than one second to warn of an object which is 30 meters away. In an example perception system 100, this inference task is processed on a coarse spatial scale over a very short duration to detect nearby objects.

(b) High spatial resolution imaging mode: Distinguishing between distant vehicles adjacent to each other at a distance of 100 meters requires an azimuth resolution of 1 meter or better. This corresponds to an angular resolution of 1/100. Angular resolution is given by wavelength/aperture, so this application requires an aperture of about 0.4 m at a carrier frequency of 77 GHz (wavelength is a little less than 4 mm). This can be achieved by deploying and coordinating across radar sensor units 102 across the front of a car, for example. This application can be more intensive in terms of both communication and computation and is coordinated over a larger spatial scale.

(c) Object signature mode: For city driving at lower speeds, processing of radar data over longer time-scales can be used to obtain microDoppler signatures for classification of salient objects. For example, the microDoppler pattern for a pedestrian is very different from that of a bicycle. Obtaining microDoppler signatures require processing data over longer time intervals but does not require as high a resolution in bandwidth.

Nominal MIMO Context

Figure 13A:
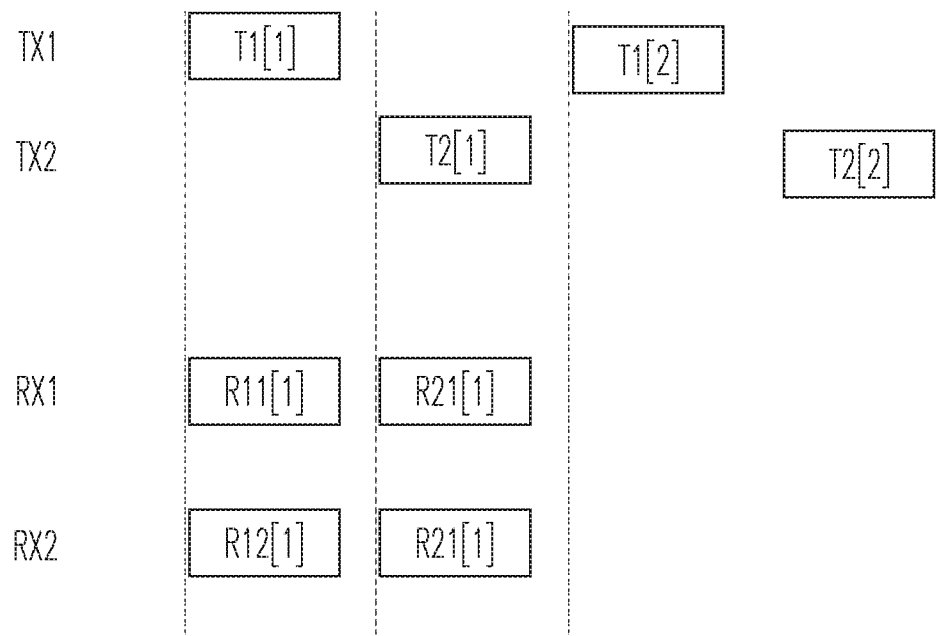
FIG. 13A is an illustrative example frame structure for a MIMO radar module with two transmit elements and two receive elements.

As an example of well-known state of the art, FIG. 13A is an illustrative example frame structure for a MIMO radar module 1202 with two transmit elements TX1, TX2 and two receive elements RX1, RX2. MIMO radar with chirp waveform: one or more transmit antennas capable of sending independent, usually orthogonal waveforms, or of transmit beamforming sending a common waveform. One or more receive antennas. In MIMO mode, N transmit antennas and M receive antennas result in NM virtual antennas which can be used to enhance angular resolution. This is often accomplished by the N transmit antennas sending in turn, storing received samples collected by the M receive antennas, and then processing the NM streams thus obtained coherently. In beamforming mode, using N transmit antennas leads to an N^2-fold increase in power transmitted in a desired direction: N-fold increase in power, and N-fold beamforming gain. Ultimately, we obtain readings in range-Doppler-angle cells in a so-called radar data cube.

In the example frame structure of, FIG. 12A, T1[*f*], T2[*f*], f=1, 2, 3, . . . denote the waveforms transmitted by TX1 and TX2, respectively, in the fth frame. In this example, the two transmitters are taking turns transmitting, but they could also transmit simultaneously using orthogonal, or nearly orthogonal waveforms. Rij[f] denotes the waveform received by RX antenna j corresponding to the signal sent by TX antenna i in frame f. The pair (i,j) corresponds to a virtual antenna element, so that there are NM=4 virtual antenna elements in this example.

Figure 13B:
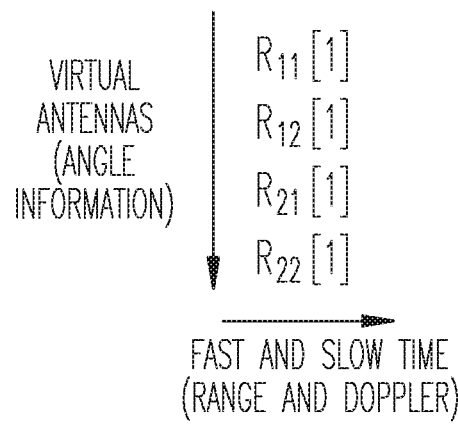
FIG. 13B is an illustrative drawing representing the organization of radar data for standard MIMO radar data processing.

FIG. 13B is an illustrative drawing representing the organization of radar data for standard MIMO radar data processing in the state of the art, which incurs a delay due to the buffering of received samples corresponding to signals. Standard radar processing typically involves buffering received samples and then processing them to extract information about range, Doppler and angle. For example, for a typical waveform consisting of a sequence of chirps, we may perform a 3D FFT: an FFT in fast time (within a chirp) for range information, and FFT in slow time (across chirps) for Doppler information, and FFT in space (across virtual antenna elements) for angle information.

MIMO EXAMPLE TIME SCALES

Example chirp duration and bandwidth, minimum and maximum ranges, frame size and frame rate, number of transmit elements and receive elements in a MIMO radar unit.

MIMO Example 1: Timely Warning Processing Path

Figure 14:
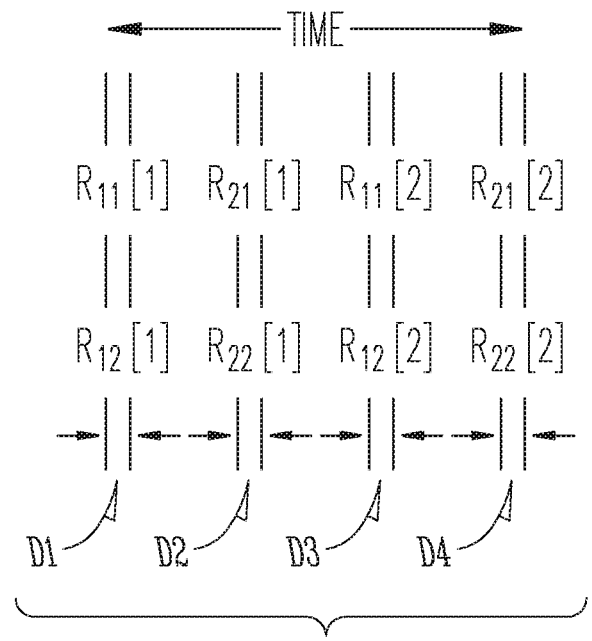
FIG. 14 is an illustrative drawing showing an example timely warning processing path.

FIG. 14 is an illustrative drawing showing an example timely warning processing path 1400, which supports a timely warning inferencing mode. Unlike standard MIMO processing, the receivers RX1, RX2 do not wait to buffer an entire waveform before processing but starts processing the radar data as soon as it starts receiving it in order to obtain range information about nearby objects. Angle information may be obtained by taking a spatial FFT across the M receive antennas, or alternatively, the received signals at the different receive antennas may be added noncoherently. For a MIMO radar, the received signals corresponding to the signals sent by different transmit antennas (not shown) are processed in parallel in the timely warning processing path 1400.

The data used for timely warning processing path 1400 comes from a small window at the beginning of a received frame in order to make a quick decision on nearby objects. Data D1 is processed to provide timely warning based upon a signal sent by TX1 in frame 1. Data D2 is processed to provide timely warning based upon a signal sent by TX2 in frame 1. Data D3 is processed to provide timely warning based upon a signal sent by TX1 in frame 2. Data D4 is processed to provide timely warning based upon a signal sent by TX2 in frame 2.

The delay incurred in the timely warning processing path 1400 is substantially smaller than that for standard MIMO processing. For example, if we have three transmit elements in a MIMO radar system taking turns sending frames of 100 ms each, then acquisition of data for processing an entire radar data cube takes 300 ms, plus the maximum round trip time (e.g., for 200 m range, this is of the order of 1.2 microseconds, which is negligible compared to the frame size). However, the round-trip time to an object that is 10 meters away is only about 60 nanoseconds, so that the timely warning processing path can start processing the radar data from a transmitter essentially as soon as the frame starts being emitted by the transmitter.

The MIMO example 1 represents a different mode of radar signal processing than the mode of radar processing in the nominal context. The timely warning processing path 1400 can be implemented in an example system 100 in which the fusion block 112 is configured to use a joint fusion block (JFB) 970 to jointly process radar data subsets 102. The timely warning processing path 1400 can be implemented in an example system 100 in which the fusion block 112 is configured to use an individual processing fusion block (IFB) 968 to individually process radar data subsets of an individual radar sensor unit 102. Moreover, both the IFB configuration 1068 and the JFB configuration 1070, operate in a standard MIMO radar mode, which we term search mode. In parallel with the processing for search mode, however, each of the sensor units 102 can also implement a parallel processing path corresponding to a timely warning mode focused on quickly detecting nearby objects using a small portion of the received waveform, without attempting to estimate Doppler. As explained above, radar data processing paths and waveform adaptations can be the mechanisms for achieving desired inference objectives. If there are multiple radar sensor units, then timely warnings from one or more of them can be used to improve detection performance via redundancy, as well as for obtaining a coarse estimate of the locations of nearby objects by trilateration techniques.

MIMO Example 2: High Spatial Resolution Imaging Processing Path

Figure 15:
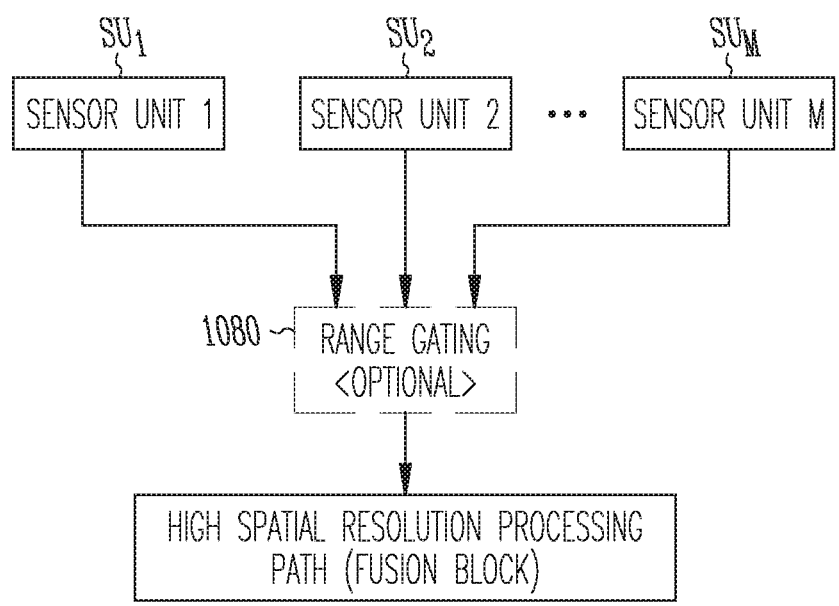
FIG. 15 is an illustrative drawing of an example high spatial resolution imaging processing path.

FIG. 15 is an illustrative drawing of an example high spatial resolution imaging processing path 1500, which supports a high resolution inference objective. Example sensor units $SU_1$-$SU_M$ provide range-angle information to the fusion block for central processing. Range gating 1502 of the range-angle information is optional. The goal is to obtain high spatial resolution by sophisticated processing in range and angle space, but Doppler information may be a lower priority. Thus, we may derive range information by performing FFT over a single chirp (or a small number of chirps), and angle information by performing a spatial FFT over virtual antennas, but not perform the slow-time FFT across multiple chirps required to acquire accurate Doppler information. Compared to standard MIMO radar processing, not performing the slow-time FFT reduces the delay in image formation, and also reduces the amount of data sent by the individual sensor modules to the fusion unit. The range-angle information can be aggregated across multiple radar modules distributed over a large aperture for increased spatial resolution. In order to enable timely information acquisition in this processing path, in one possible embodiment involving MIMO radar, different transmitters may send orthogonal waveforms simultaneously, rather than taking turns. The high spatial resolution imaging processing path 1500 can be implemented in an example system 100 in which the fusion block 112 is configured to use a joint fusion block (JFB) 970 to jointly process radar data subsets 102 in from data gathered during a standard MIMO radar search mode. Since the goal is to enhance range and angular resolution rather than Doppler resolution, each of the sensor units 102 can send a short segment of data, and the central fusion unit can fuse them to provide enhanced angular resolution.

MIMO Example 3: Object Signature Processing Path

Figure 16A:
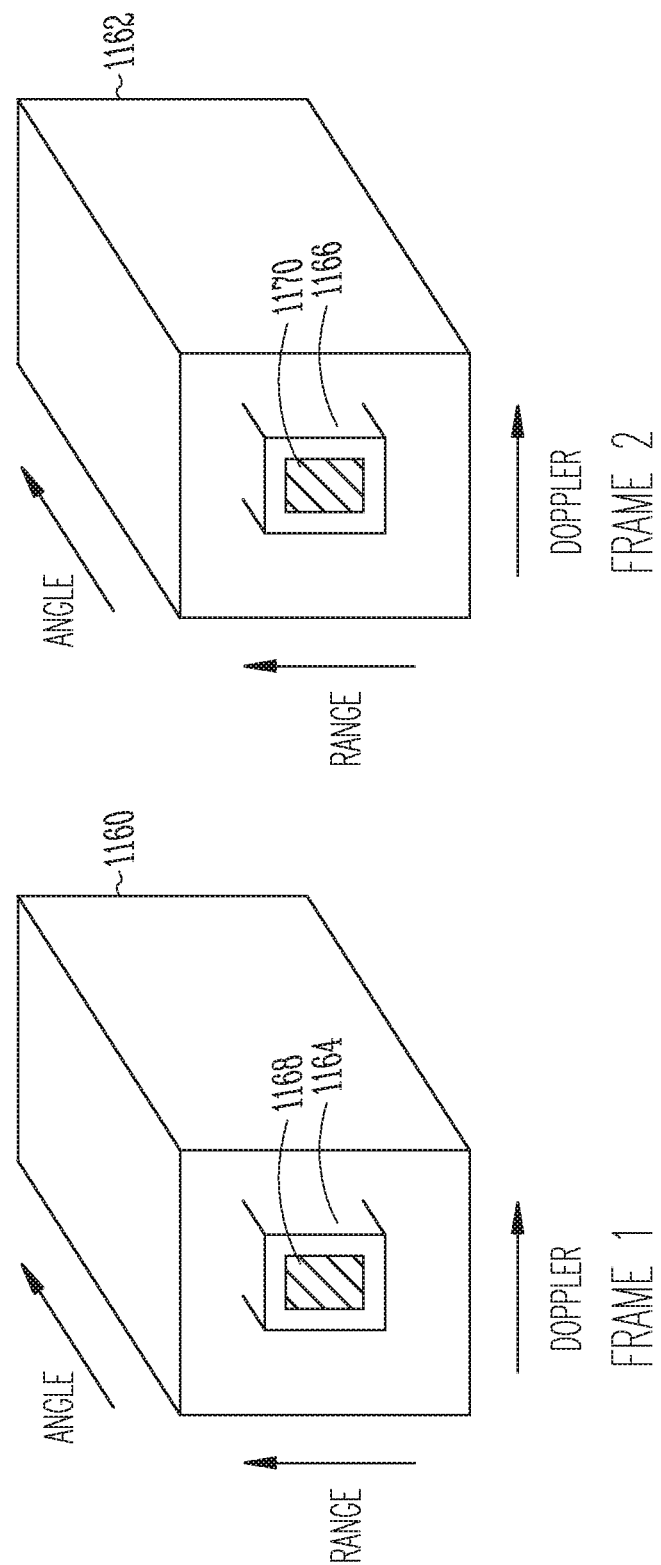
FIG. 16A is an illustrative drawing representing an example an example object signature processing path.

FIG. 16A is an illustrative drawing representing an example object signature processing path 1600, which supports an object signature inference objective. First radar data 1660 is captured during Frame 1, and second radar data 1662 is captured during Frame 2. Each of the first and second radar data 1660, 1662 includes a respective data subset 1664, 1666 that contains respective energy 1668, 1670 corresponding to a tracked object (not shown). An object signature processing path spans multiple frames. Standard range-Doppler-angle processing using per-frame measurements may be used for tracking salient objects across frames. For salient objects being tracked, the portion of the radar data corresponding to that object (e.g., a subset of the range-Doppler-angle radar cube) is termed the object region of interest (ROI). Object ROIs can be aggregated across multiple frames and processed to obtain signatures for that object across a longer time scale. An example signature is obtained by taking temporal Fourier transforms to derive microDoppler information. Such signatures can be used for, example, for model-based or data-driven inference regarding the object class (e.g., pedestrian, bicycle, dog).

The object signature processing path 1600 can be implemented in an example system 100 in which the fusion block 112 is configured to use a joint fusion block (JFB) 970 to jointly process radar data subsets 102. With multiple sensor units, the fusion unit 112 can provide improved tracking performance for salient objects, and thus provide more precise feedback enabling each sensor to determine its object ROIs. Each sensor unit can then compute an object signature over multiple frames, and the object signatures from multiple sensors can be employed by the fusion unit for improved inference regarding object class. The data gathered for this purpose can be obtained while operating in standard MIMO radar search mode. Standard 3D FFTs can be taken to determine ROIs corresponding to the tracked object in each frame, but the object ROIs collected over multiple frames are then used in a parallel object signature processing path. In contrast to standard MIMO, each sensor unit employs ROIs corresponding to the object being tracked over multiple frames.

Figure 16B:
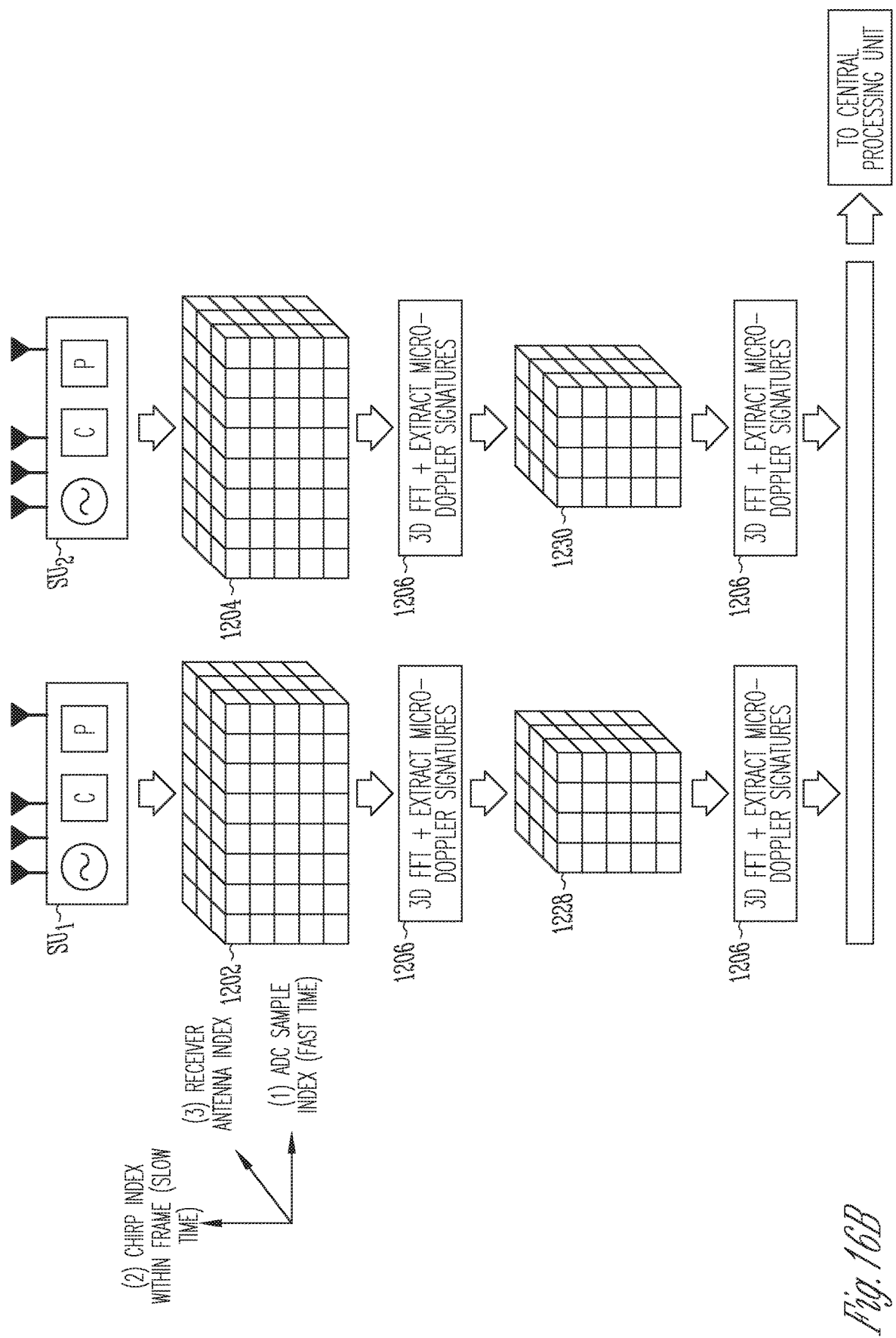
FIG. 16B is an illustrative block diagram showing an alternative example object signature processing path suited for Doppler processing and in-sensor processing.

In-Sensor Radar Data Reduction and Transformation for Micro-Doppler Signature Acquisition FIG. 16B is an illustrative block diagram showing an alternative example object signature processing path suited for Doppler processing and in-sensor processing in accordance with a Doppler processing and in-sensor processing inference objective. Sensor units $SU_1$ and $SU_2$ receive respective radar data 1602, 1604. The radar data 1702, 1704 is organized according to indexes 1603 for slow time/fast time/receiver antenna. Sensor units $SU_1$, $SU_2$ include respective radar pipeline portions 1606 to select respective radar subsets 1628, 1630 that include reduced fast-time data and reduced antenna data, but that do not reduce slow time (chirp) data. Respective portions of the radar data pipelines 1606 of the first and second sensor units $SU_1$, $SU_2$ transform the data subsets 1628, 1630 using 3D FFT and extract micro-Doppler signatures and send the transformed radar data subsets and micro-Doppler signatures over the network to the fusion block for central processing.

A large time window is required to capture the micro-Doppler signatures of an extended moving target (high Doppler resolution). The frequency occupancy (bandwidth) of the waveform and the spatial extent of the acquisition (aperture) can also help in:

Reducing the background clutter in the signature of intended targets

Providing the possibility of extracting signatures of multiple targets at once

Providing resilience against RCS variations of objects (angular diversity)

Capturing micro-Doppler signatures in a higher dimensional space (from multiple vantage points)

Sensor units $SU_1$ and $SU_2$ receive respective radar data 1602, 1604. Sensor units $SU_1$, $SU_2$ include respective radar pipeline portions 1606 to implement a radar mode in which select respective radar subsets 1628, 1630 that include reduced fast-time data and reduced antenna data, but that do not reduce slow time (chirp) data. Respective portions of the radar data pipelines 1606 of the first and second sensor units $SU_1$, $SU_2$ transform the data subsets 1628, 1630 using 3D FFT and extract micro-Doppler signatures and send the transformed radar data subsets and micro-Doppler signatures over the network to the fusion block for central processing.

Radar Data Reduction Example—High-Resolution 2D Range-Angle Image Formation

In order to create a high resolution 2D image radar data must be collected across frequency (for range resolution), and space (for angular resolution) large spectral bandwidth and large aperture. Ideally radar data is collected over a very short period of time, hence only a small number of chirps are required (e.g., only one chirp) per antenna element. This can be accomplished in multiple ways. This can be accomplished either by adapting transmitted waveforms (to send fewer chirps per frame), or by selecting a smaller section of the received waveform (which can employ a larger number of chirps per frame in order, for example, to capture information regarding Doppler and micro-Doppler) to be processed and shared.

In-Sensor Radar Data Reduction for 2D Radar Imaging

Figure 17:
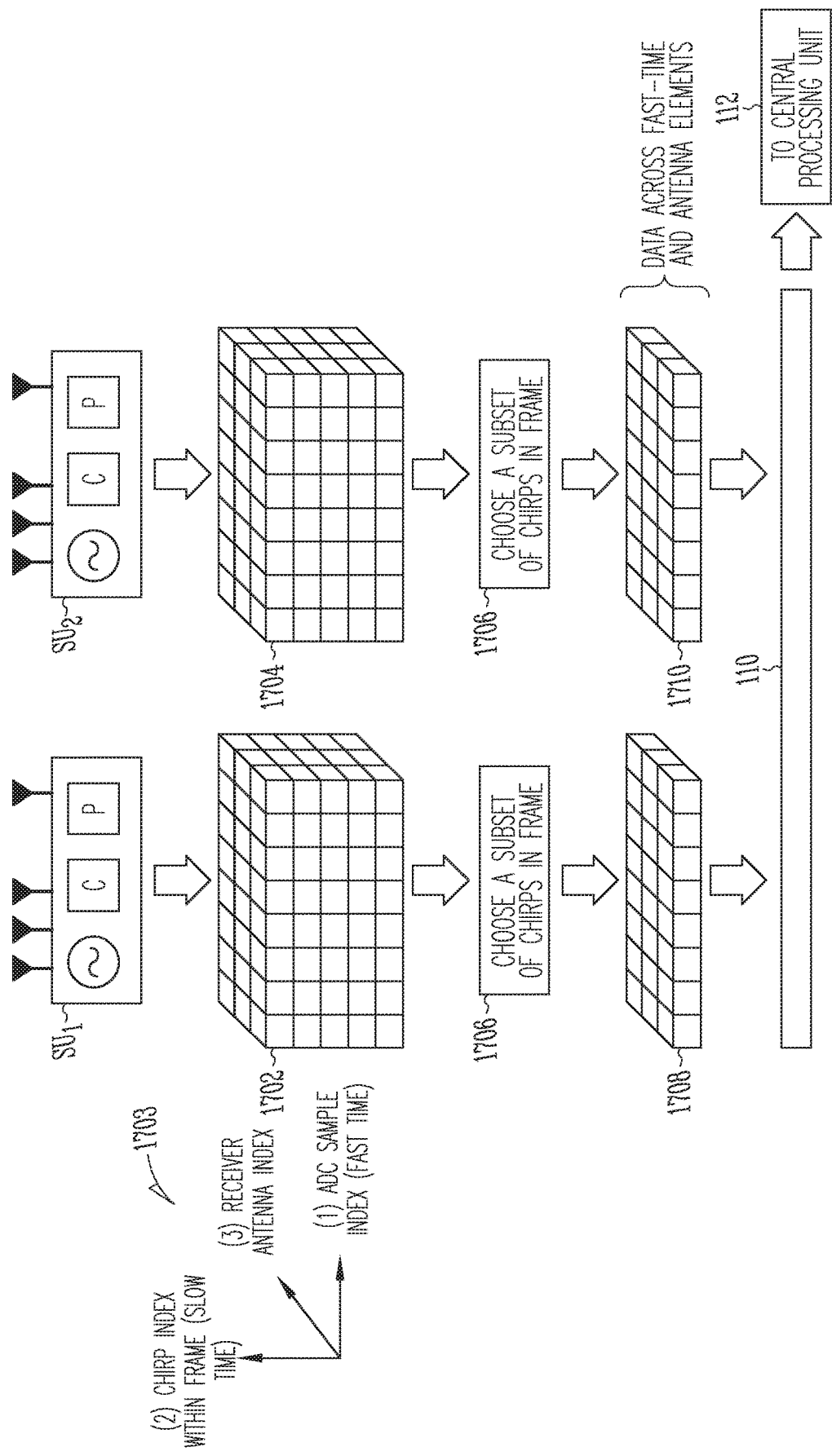
FIG. 17 is an illustrative block diagram showing radar sensor units selecting a radar data subset of chirps per frame to achieve minimum information sharing for high-resolution 2D radar image across large aperture.

FIG. 17 is an illustrative block diagram showing sensor units selecting a radar data subset of chirps per frame to achieve minimum information sharing for high-resolution 2D radar image across large aperture. Sensor units $SU_1$ and $SU_2$ receive respective radar data 1702, 1704. The radar data 1702, 1704 is organized according to indexes 1703 for slow time/fast time/receiver antenna. Sensor units $SU_1$, $SU_2$ include respective radar pipeline portions 1206 to select respective radar subsets 1708, 1710 that include fewer chirps, but that do not reduce fast time or antenna element information. The radar data subset 1708, 1710 are sent over the network 110 to the fusion block 112 for central processing to create a fused high resolution 2D radar image base upon the reduced-chirp radar data subsets 1708, 1710.

Figure 18A:
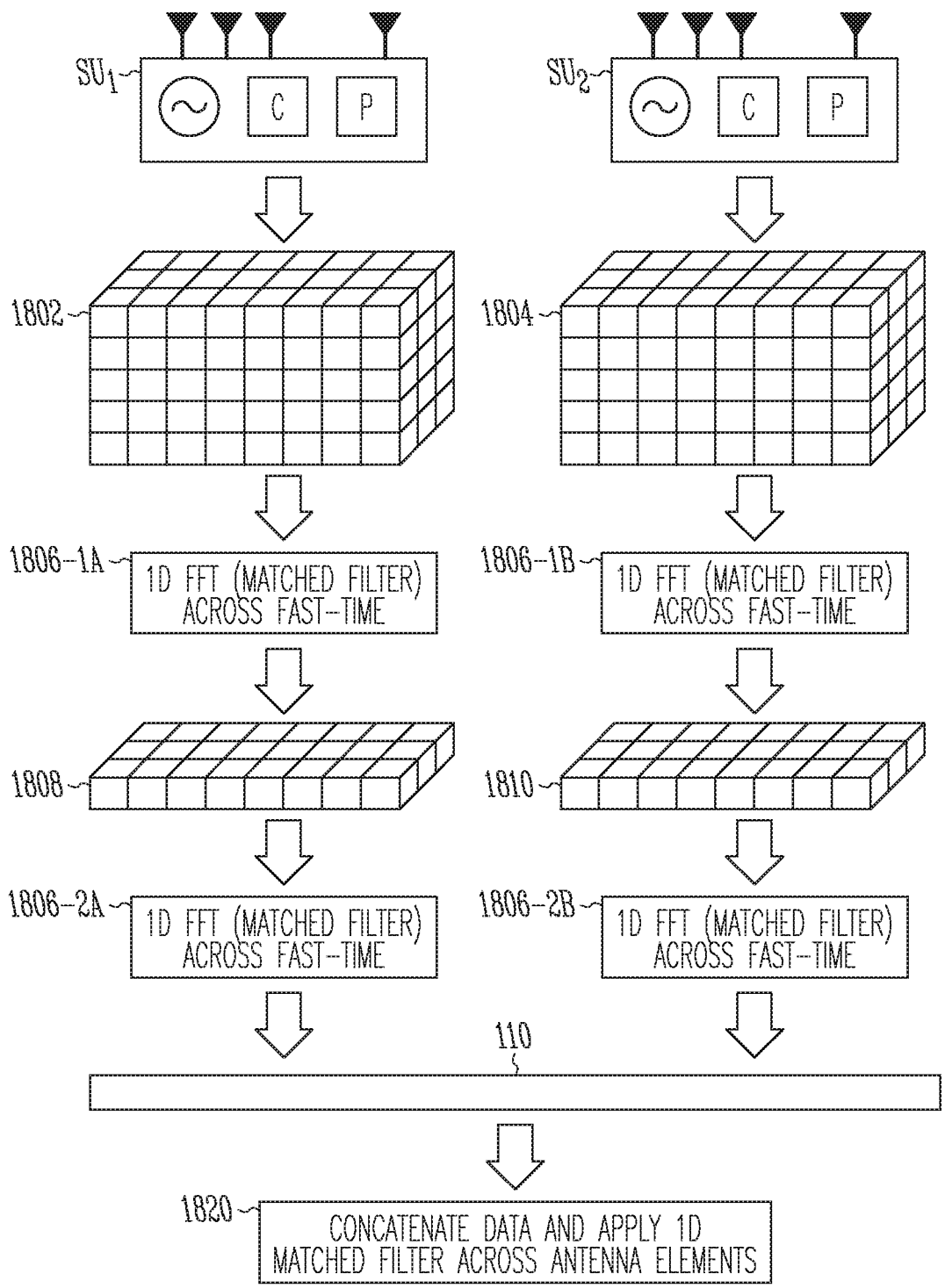
FIGS. 18A-18B are illustrative block diagrams showing partial in-sensor processing of radar data followed by central combining (FIG. 18A) versus fully centralized image formation (FIG. 18B).
Figure 18B:
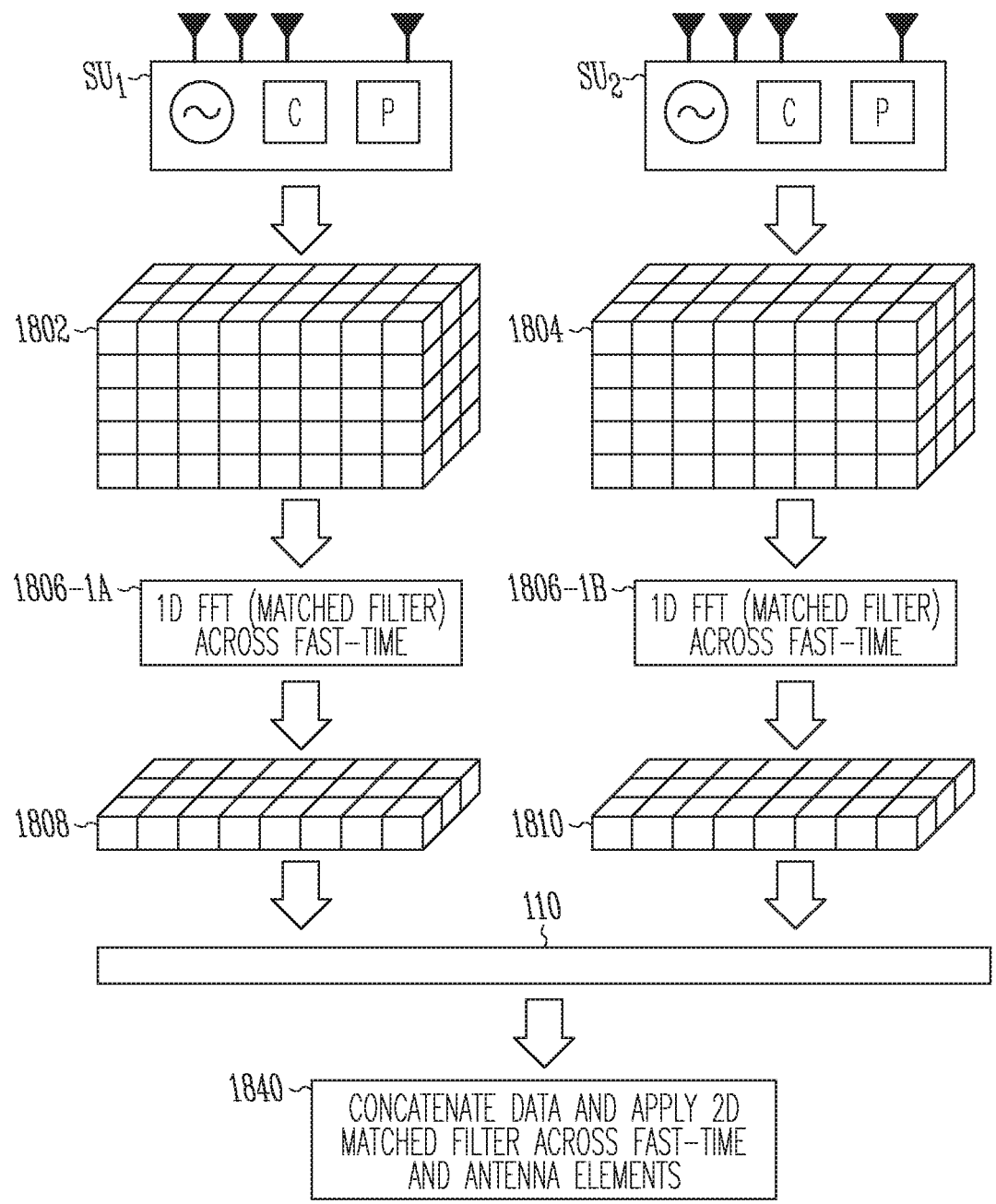

In-Sensor Radar Data Reduction and Transformation for High Spatial Resolution Imaging Mode FIGS. 18A-18B are illustrative block diagrams showing partial in-sensor processing of radar data followed by central combining (FIG. 18A) versus fully centralized image formation (FIG. 18B). Radar data in-sensor processing to select reduced-chirp radar data subsets 1808, 1810 is described will be understood from the explanation of FIG. 17 and for conciseness and efficiency, will not be repeated. In FIG. 18A, respective portions of the radar data pipelines 1806 of the first and second sensor units perform 1D FFT (matched filter) 1806-1A, 1806-1B across fast-time and perform 1D FFT (matched filter) 1806-1A, 1806-1B across fast-time and send the resulting transformed radar data subset over the network to the fusion block 112, which concatenates and applies a 1D matched filter 1820 across the antenna elements of the radar data subsets 1808, 1810. Thus, the sensor units $SU_1$, $SU_2$, in FIG. 18A not only reduce the radar data, but also partially process the reduced radar data. In FIG. 18B, the radar data units send the radar data subsets 1808, 1810 without further transformation over the network to the fusion block 112, which concatenates the received radar data subsets and applies a 2D matched filter 1840 across the fast-time and the antenna elements portions of the radar data subsets.

Example of Alerts

Sensor units use a low latency path (LLP) such as is used to provide alerts of events requiring immediate action. Sending alerts to provide warnings over a LLP can have several advantages. Example characteristics of a radar-centric perception system 100 with distributed radar sensor units 102 with distributed processing capabilities and a centralized processing unit include one or more of,
  In-sensor processing and generation of alerts can be used (e.g., via the timely warning processing path explained with reference to FIG. 14) since LLP permits rapid communication of warnings to a centralized processing unit, which can rapidly implement collision avoidance in response to alerts.
  Low-overhead distributed data sharing of processing of potential events at multiple sensor units
  Diversity gain to improve detection accuracy and reduce false alarm
  Verification of certain critical events/scenes based on independent measurements from different sensors
  Multiple vantage points to build resilience against radar cross section (RCS) variations and other phenomena which may make the output of a single sensor unit less reliable. These may include complexities in the scene and impairments in the sensors which may be difficult to model explicitly.

Figure 19:
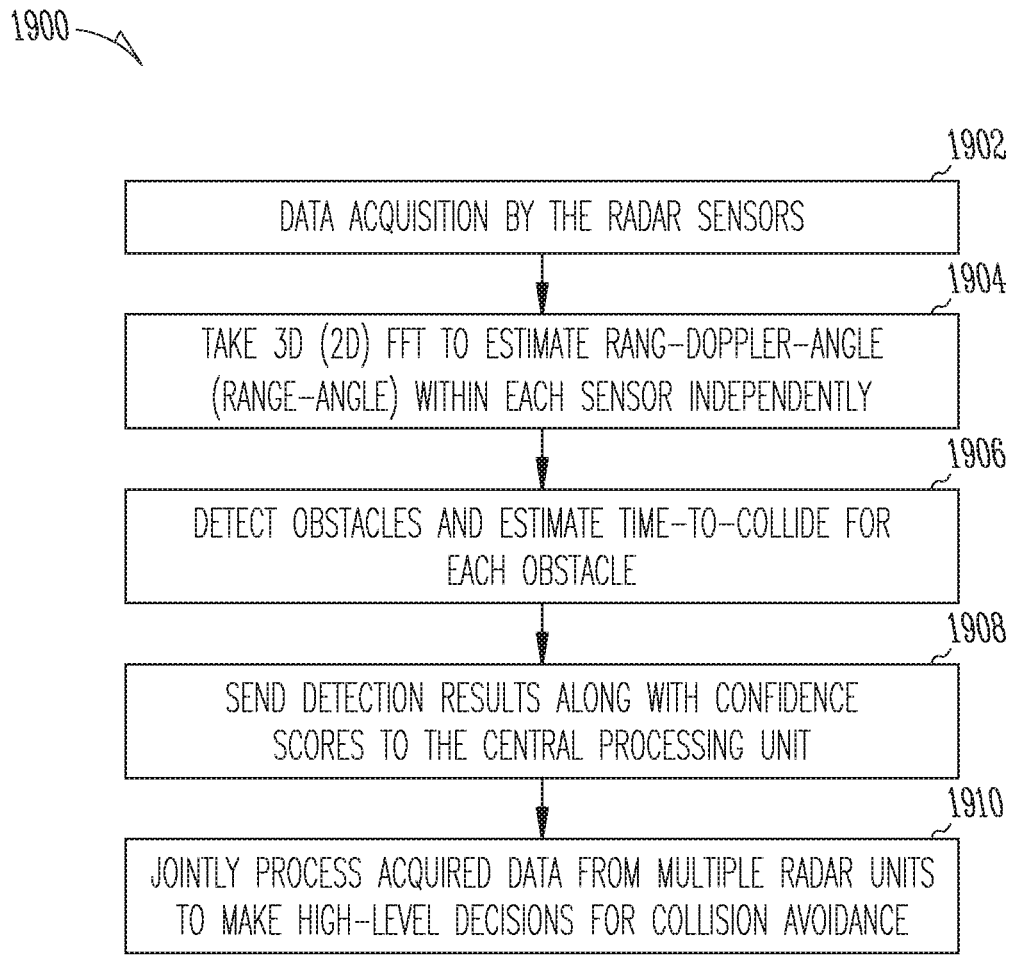
FIG. 19 is an illustrative flow diagram representing an example process involving an alert for collision avoidance.

It is noted that the timely warning processing path in FIG. 14, low latency communication path (LLP) in FIG. 1A, and alert for collision avoidance in FIG. 19 all can be closely related. Quick processing via timely warning path produces alerts at each sensor unit 102, which are communicated via low latency path to the central fusion block 112.

FIG. 19 is an illustrative flow diagram representing an example process 1900 involving an alert for a collision avoidance inference objective. At step 1902 the sensor units 102 locally acquire radar data at their spatially distributed locations on a mobile platform, e.g., an automobile. The fusion block 112 of an example perception system 100 is configured to use an individual processing fusion block (IFB) 968 to individually process radar data subsets of an individual radar sensor unit 102 to implement alert collision avoidance. Thus, each sensor unit 102 operates in an alert detection radar mode of operation. Different sensor units have radar apertures to detect radar data in different regions about the platform. At step 1904, each sensor unit independently takes 3D (or alternatively, for example, 2D) FFT to estimate range-Doppler angle (range-angle) within each sensor unit, independently. At step 1906, each sensor unit detects obstacles detected within the radar data that it acquired and estimates a time-to-collide for each obstacle. At step 1908, the sensor units 102 send the collision estimation results with confidence scores to a centralized processing unit at the fusion block over a LLP. The centralized processing unit 112 processes the acquired data received from the multiple sensor units 102 to make a high-level (centralized) decisions for collision avoidance. In one example scenario, the central processing can determine based upon the acquired radar data, for example, that an obstacle is in motion and moving away from the direction of motion of the mobile platform, e.g., an automobile, and therefore, no collision avoidance is required. Alternatively, in another example scenario, the central processing can determine based upon the acquired radar data, for example, that an obstacle is moving toward the right side of the platform and that a swerve to the left and braking can avoid collision.

Figure 20:
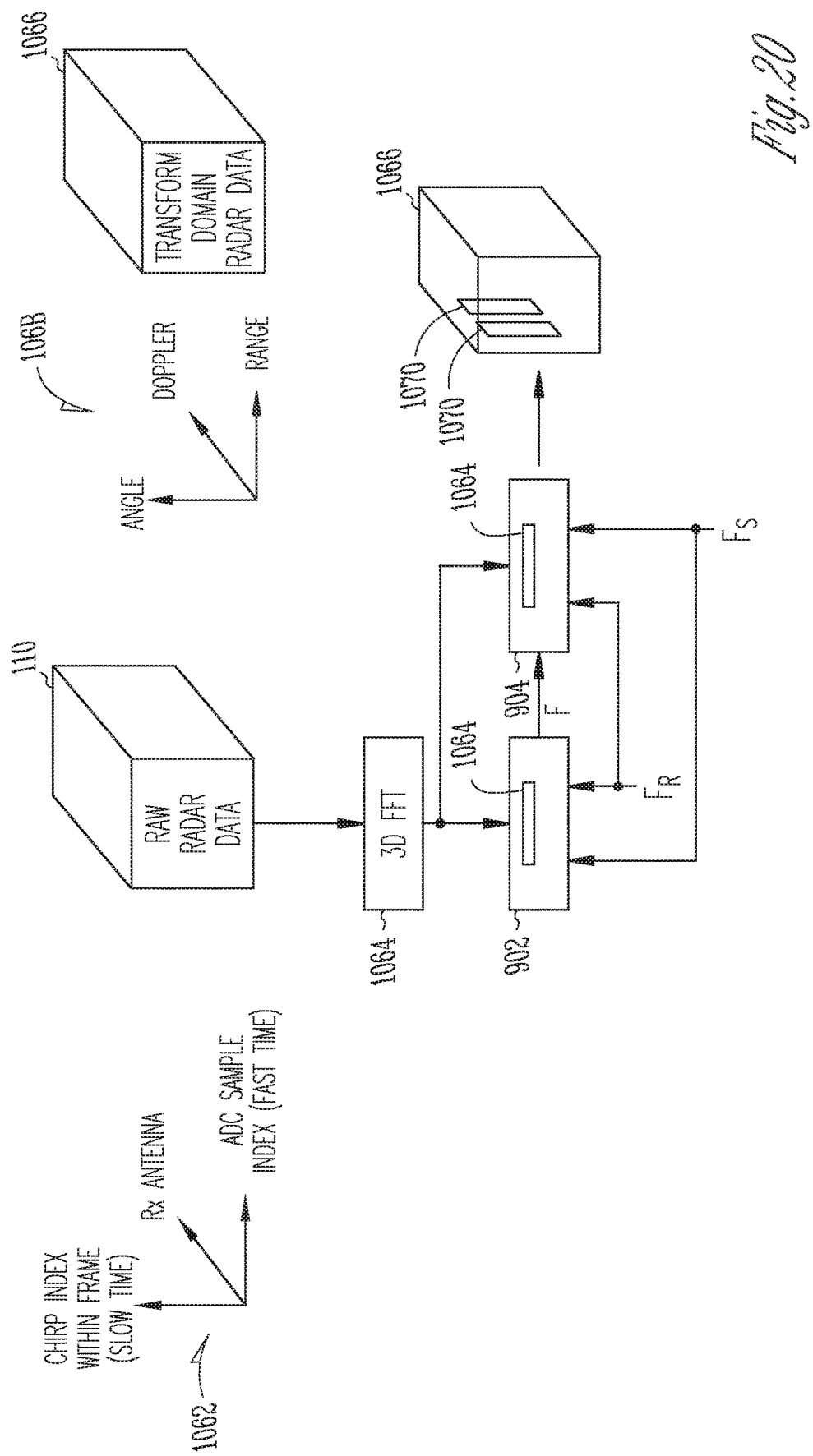
FIG. 20 is an illustrative block diagram in which the radar data subset selection circuit block of FIG. 6 and FIG. 8A selects an ROI and data based at least in part upon radar data in a transform domain.

FIG. 20 is an illustrative block diagram in which the radar data subset selection circuit block 610 of FIG. 6 and FIG. 8A selects an ROI and data based at least in part upon radar data in a transform domain. Referring to FIG. 8A and to FIG. 20, the raw radar data 1060 is received in a fast/slow/receiver index format 1062. A radar pipeline portion 1064 at the sensor unit 102 performs a 3D FFT transform of the raw data 1060 to transform radar data 1066 in a range/Doppler/angle domain 1068. A radar pipeline portion 1064 determines local radar parameters for the transform domain radar data 1066. The ROI and radar data selection are selected based upon one or more of the determined local radar data parameters, $F_R$ information and the $F_S$ information. Thus, the circuit block 610 operates in an ROI detection radar mode of operation. For example, $F_R$ information can be used, for example, when tracking a target based on information from multiple sensor units, the ROI in which the target is expected to fall can be provided as $F_R$ feedback to individual sensors for data reduction. Also, for example, the $F_S$ information can be used, for example, that corresponds to salient objects detected by an imaging system. An example radar data subset 1070 that consists of the radar data selected from within the selected ROI is sent by the ROI data selection block 904 over the network for central processing at the fusion block.

Figure 21A:
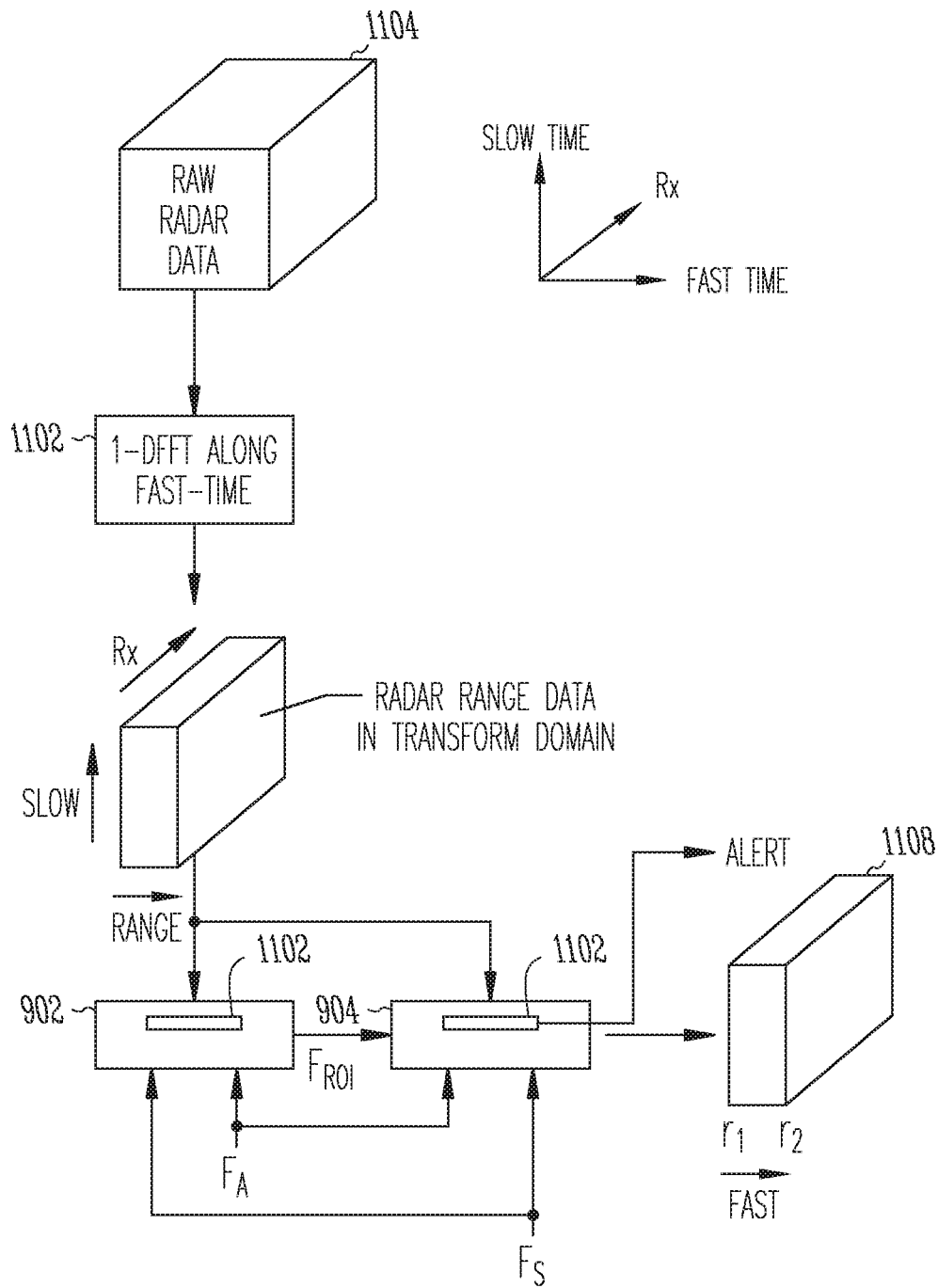
FIG. 21A is an illustrative block diagram in which the radar data subset selection circuit block of FIG. 6 and FIG. 8A selects a radar data subset with reduced range data.
Figure 21B:
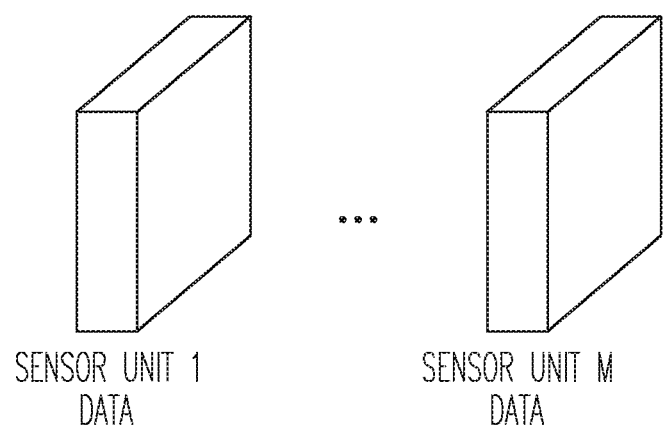
FIG. 21B is an illustrative drawing representing respective raw range-gated radar data subsets received at a fusion block from multiple sensors units.

FIG. 21A is an illustrative block diagram in which the radar data subset selection circuit block 610 of FIG. 6 and FIG. 8A selects a radar data subset with reduced range data. In this example, assume that one or both of $F_R$ information and $F_S$ information indicate that range information is of interest. In response to the indication, a portion of a local radar data pipeline 1102 at the sensor unit 102 transforms raw radar data 1104 using a 1D FFT to produce radar data range in a transform domain 1106. Specifically, in this example, assume that a 1D FFT is performed in fast time to obtain the range cells, while not performing FFT in slow time or along virtual receive elements. A portion of the local the local radar data pipeline 1102 evaluates a radar range parameter in a transform domain 1106 to determine that local radar data range parameters indicate a potential target at a range of 10-20 meters. In this example, assume that an inference objective requires that target information at close range (10-20 meters) is a basis to send an alert. Accordingly, a radar pipeline portion 1102 sends the transform-domain close-range data together with identifying metadata over a LLP to the fusion block 112 for immediate attention, such as for collision avoidance. Moreover, the ROI data selection block sends over the network a data subset 1108 that includes raw radar data for only ranges r1=10 meters to r2=20 meters together with metadata indicating contents of the radar data subset, e.g., range gated to include only radar data within a range 10-20 meters. The radar data subset 1108 is reduced since it does not include range data outside the 10-20 meters. Assuming, for example, that radar elements at a sensor unit receive radar data at up to 300 meters, a reduction of the radar data to include only range data within 10-20 meters is significant.

FIG. 22B is an illustrative drawing representing respective raw range-gated radar data subsets $1108_1$ to $1108_M$ received at a fusion block 112 from multiple sensors units $SU$ to $SU_M$. The fusion block can jointly process the multiple range-gated radar data to obtain better angular resolution and velocity estimates than could be obtained at the small aperture spatially distributed radar units. Thus, radar sensor units 102 can be configured to implement an ROI radar mode of operation while the fusion block 112 can have a JFB configuration 1070 and be configured to simultaneously implement a MIMO radar mode to detect an object signature, for example. Thus, spatially distributed sensors 102 are used to acquire radar data and to select a certain range interval for high-resolution imaging.

Computing Machine

FIG. 22 is an illustrative block diagram of a computing machine 2200 in which to implement the sensor units $SU_1$-$SU_M$, the fusion block 112 and the sensor block 552. As used herein, the phrase "computing machine" encompasses its plain and ordinary meaning. A "computing machine" may include one or more computing machines. A computing machine may include one or more of a server, a data repository, a client device, and the like. A client device may include a laptop computer, a desktop computer, a mobile phone, a smart watch, a tablet computer, a smart television, a personal digital assistant, a digital music player, and the like. A computing machine may be any device or set of devices that, alone or in combination, includes processing circuitry and memory. Each sensor unit $SU_1$-$SU_M$ can comprise a different instance of the computing machine 2200 as can the fusion block 112 and the sensor block 552. In some embodiments, the computing machine 2200 operates as a standalone device or may be connected (e.g., networked) to other computers. In a networked deployment, the computing machine 2200 can operate in the capacity of a server or a client computer in a server-client network environment, or as a peer computer in a peer-to-peer (or distributed) network environment, for example.

The example computing machine 2200 includes a hardware processor 2222 (e.g., a central processing unit (CPU), a graphics processing unit (GPU) or both), main memory 2204 and static memory 2206, which communicate with each other via bus 2208. A disk drive unit 2226, which can act as data storage 2225, includes computer-readable storage device 2222 on which is stored one or more sets of instructions and data structures (e.g., software 2224) embodying or utilized by any one or more of the methodologies or functions described herein. The software 2224 may also reside, completely or at least partially, within a computer readable storage device such as the main memory 2204 and/or within the processor 2222 during execution thereof by the computing machine 2200, the main memory 2204 and the processor 2222 also constituting non-transitory computer-readable media. The software 2224 can further be transmitted or received over network 2226 via a network interface device 2220 utilizing any one of a number of well-known transfer protocols (e.g., HTTP).

The processing system 2202 is operably coupled to non-transitory computer readable media, 2204, 2206 and 2216. The non-transitory computer readable media store a plurality of instructions that are accessible to, and executable by, the processing system 202. The plurality of instructions include instructions that when executed, configure the computing machine 2200 to implement the radar signal processing pipeline and processes of FIGS. 8B-8C and FIGS. 11B-11C, for example, and to configure the fusion block to operate in the IFB configuration 968 and in the JFB configuration 970, for example.

The above description is presented to enable any person skilled in the art to create and use a robust radar-centric perception system. Various modifications to the examples will be readily apparent to those skilled in the art, and the generic principles defined herein may be applied to other examples and applications without departing from the sof the invention. In the preceding description, numerous details are set forth for the purpose of explanation. However, one of ordinary skill in the art will realize that the examples in the disclosure might be practiced without the use of these specific details. In other instances, well-known processes are shown in block diagram form in order not to obscure the description of the invention with unnecessary detail. Identical reference numerals are used in some places to represent different views of the same or similar items in different drawings. Thus, the foregoing description and drawings of embodiments and examples are merely illustrative of the principles of the invention. Therefore, it will be understood that various modifications can be made to the embodiments by those skilled in the art without departing from the scope of the invention, which is defined in the appended claims.

The invention claimed is:

1. A radar data acquisition circuit comprising:
a radar receiver to receive radar data representing a radar scene in response to an adaptive sequence of extended sampling waveform frames that includes two or more extended sampling waveform subframes that include a baseline search type sampling waveform subframe and an adaptive type sampling waveform subframe;
a first processor;
a first non-transitory computer readable medium, the first non-transitory computer readable medium operably coupled to the first processor, that stores instructions, which when executed using the first processor, cause the first processor to perform operations comprising:
producing one or more radar data parameters of the received radar data;
generating one or more replacement adaptive type sampling waveform subframes to include in at least one of the two or more of the extended sampling waveform frames of the sequence, based at least in part upon the one or more radar parameters.

2. The radar data acquisition circuit of claim 1,
wherein generating the one or more replacement adaptive type sampling waveform subframes to include in at least one of the two or more extended sampling waveform frames of the sequence includes generating based at least in part upon one or more radar parameters of radar data sampled using the baseline search type sampling waveform subframe within a current extended sampling waveform frame of the sequence of extended sampling waveform frames.

3. The radar data acquisition circuit of claim 1,
wherein generating the one or more replacement adaptive type sampling waveform subframes to include in at least one of the two or more extended sampling waveform frames of the sequence includes generating based at least in part upon one or more radar parameters of radar data sampled using multiple sampling waveform subframes of a current extended sampling waveform frame of the sequence of extended sampling waveform frames.

4. The radar data acquisition circuit of claim 1,
wherein generating one or more replacement adaptive type sampling waveform subframes to include in at least one of the two or more extended sampling waveform frames of the sequence includes generating based at least in part upon one or more radar parameters of radar data sampled using an entire current frame of the sequence of extended sampling waveform frames.

5. The radar data acquisition circuit of claim 1,
wherein generating one or more replacement adaptive type sampling waveform subframes to include in at least one of the two or more extended sampling waveform frame frames of the sequence includes generating based at least in part upon one or more radar parameters of radar data sampled using one or more sampling waveform subframes of a previous frame of the sequence of extended sampling waveform frames.

6. The radar data acquisition circuit of claim 1,
wherein at least one replacement adaptive type sampling waveform subframe includes a sampling waveform with a higher range resolution than the baseline search type sampling waveform subframe.

7. The radar data acquisition circuit of claim 1,
wherein at least one replacement adaptive type sampling waveform subframe includes a sampling waveform with a higher Doppler resolution than the baseline search type sampling waveform subframe.

8. The radar data acquisition circuit of claim 1,
wherein at least one replacement adaptive type sampling waveform subframe includes a beamforming sampling waveform.

9. The radar data acquisition circuit of claim 1,
wherein respective extend frames of the sequence of subframes have a time length in a range 100 microseconds to 50 milliseconds.

10. The radar data acquisition circuit of claim 1,
wherein respective extend frames of the sequence of subframes have a time length in a range 100 microseconds to 100 milliseconds.

11. The radar data acquisition circuit of claim 1, further comprising:
a vision sensor that is positioned to capture an image within a vision sensor field of view that overlaps the radar scene and that produces vision sensor-based information indicative of the captured image;
wherein generating one or more replacement adaptive type sampling waveform subframes to include in an extended sampling waveform frame of the sequence includes generating based at least in part upon the vision-based information.

12. The radar data acquisition circuit of claim 11,
wherein the instructions further include:
selecting a region of interest within the radar scene, based at least in part upon the one or more radar parameters and the vision-based information.

13. The radar data acquisition circuit of claim 1, further comprising:
a location sensor that determines a location of the radar receiver and that produces location sensor-based information indicative of radar receiver location;
wherein generating one or more replacement sampling adaptive type waveform subframes to include in an extended waveform sampling waveform frame of the sequence includes generating, based at least in part upon the location sensor-based information.

14. The radar data acquisition circuit of claim 13,
wherein the instructions when executed using the first processor, cause the first processor to perform operations comprising:
selecting a region of interest within the radar scene, based at least in part upon the one or more radar parameters and the location sensor-based information.

15. A coordinated radar system comprising:
multiple radar sensor units;
a radar data fusion circuit including a first computing machine that includes a first processor;
a communication network to communicate information between the first computing machine and the multiple respective radar sensor units;

wherein each respective radar sensor unit includes,
a respective radar receiver coupled to receive respective radar data representing a respective radar scene within a respective local radar aperture associated with the respective sensor unit, in response to an adaptive sequence of extended sampling waveform frames, wherein at least one of the extended sampling waveform frames includes a baseline search type sampling waveform subframe and an adaptive type sampling waveform subframe;
a respective local computing machine including a respective local processor; and
a respective local non-transitory computer readable medium operably coupled to the respective local computing machine, that stores instructions, which when executed using the respective local computing machine, cause the respective local computing machine to perform local operations comprising:
producing respective local radar data parameter information of the respective received radar data;
receiving respective radar-based feedback information, corresponding to the respective radar sensor unit, over the communication network, from the fusion circuit;
generating a respective replacement adaptive type sampling waveform subframe to include in the at least one of the extended sampling waveform frames, based upon the respective received radar-based feedback information or based upon the respective local radar data parameter information, or based at least in part upon a combination of the respective received radar-based feedback information or the respective local radar data parameter information;
selecting one or more respective subsets of the radar data based upon the respective received radar-based feedback information or based upon the respective local radar data parameter information, or based at least in part upon a combination of the respective received radar-based feedback information and the respective local radar data parameter information; and
sending the respective one or more selected subsets of the radar data subsets over the communication network to the radar data fusion circuit; the radar system further including:
a second non-transitory computer readable medium, operably coupled to the first computing machine, that stores instructions, which when executed using the first computing machine, cause the first computing machine to perform centralized operations comprising:
receiving respective one or more selected subsets of the radar data over the communication network from the multiple respective sensor units;
fusing the respective one or more selected subsets of the radar data received over the network from the multiple respective sensor units, to produce a fused radar aperture;
producing respective radar-based feedback information, corresponding respective radar sensor units, based at least in part upon radar data within the fused radar aperture; and
sending the respective radar-based feedback information over the communication network to the respective corresponding respective radar sensor units.

16. The coordinated radar sensor of claim 15,
wherein for one or more of the multiple respective radar sensor units, at least one of the respective received radar-based feedback information includes one or more of a target tracked by a different respective radar sensor unit or a region of interest identified by a different respective radar sensor unit, or a combination thereof.

17. The coordinated radar sensor of claim 15,
wherein for one or more of the multiple respective radar sensor units, the local radar data parameter information includes one or more of range information, Doppler information, angle information, or a combination thereof.

18. The coordinated radar sensor of claim 15, further including:
a vision sensor that is positioned to capture an image within a vision sensor field of view that overlaps respective radar scenes of one or more respective radar receivers and that produces vision sensor-based information indicative of the captured image;
wherein the instructions when executed using the first processor, cause the first processor to perform operations comprising:
for the one or more respective radar receivers having a respective radar scene that overlaps with the vision sensor filed of view, generating a respective replacement adaptive type sampling waveforms based upon respective received radar-based feedback information, based upon respective local radar data parameter information, based upon vision sensor-based information or based upon at least in part upon a combination of two or more of the respective received radar-based feedback information, the respective local radar data parameter information or the vision sensor-based information.

19. The coordinated radar sensor of claim 15,
a location sensor that to determine respective location information for one or more respective radar receivers;
wherein the instructions when executed using the first processor, cause the first processor to perform operations comprising:
for one or more respective radar receivers for which respective location information is determined, generating a respective replacement adaptive type sampling waveform based upon respective received radar-based feedback information, based upon respective location information, and based or based at least in part upon a combination of two or more of respective received radar-based feedback information, respective local radar data parameter information or respective location information.

20. The coordinated radar sensor of claim 15,
wherein the local operations further include:
sending respective alert information, over the communication network, to the radar data fusion circuit based upon detecting a potential event within the respective local radar aperture.

21. The coordinated radar system of claim 15,
wherein the local operations further include:
sending respective alert information, over the communication network, to the radar data fusion circuit based upon detecting a potential event within the respective local radar aperture; and wherein the centralized operations further include:
sending respective alert information to a control system, based upon receiving respective alert information from one or more of the multiple respective radar sensor units.

22. The coordinated radar system of claim 21,
wherein the communication network includes a low latency path; and
wherein sending the respective alert information, over the communication network, to the radar data fusion circuit includes sending the alert information over the low latency path.

23. The coordinated radar system of claim 20,
wherein detecting the potential event includes detecting a potential collision.

24. A method to acquire radar data comprising:
receiving radar data at a radar receiver representing a radar scene, in response to an adaptive sequence of extended sampling waveform frames that includes two or more extended sampling waveform subframes that each includes a baseline search type sampling waveform subframe and an adaptive type sampling waveform subframe; and
producing one or more radar data parameters of the received radar data;
generating one or more replacement adaptive type sampling waveform subframes to include in at least one of the two or more extended sampling waveform frames of the sequence, based at least in part upon the one or more radar parameters of received radar data.

25. The method of claim 24,
wherein generating includes generating based upon one or more radar parameters of radar data received using a search frame within a subframe of a current extended sampling waveform frame of the sequence of extended sampling waveform frames.

26. The method of claim 24,
wherein generating includes generating based upon one or more radar parameters of radar data received using multiple subframes of a current extended sampling waveform frame of the sequence of extended sampling waveform frames.

27. The method of claim 24,
wherein generating includes generating based upon one or more radar parameters of radar data received using an entire current frame of the sequence of extended sampling waveform frames.

28. The method of claim 24,
wherein generating includes generating based upon one or more radar parameters of radar data received using one or more subframes of a previous frame of the sequence of extended sampling waveform frames.

29. The method of claim 24,
wherein at least one replacement adaptive type sampling waveform frame includes a sampling waveform with a higher range resolution than the search sampling waveform subframe.

30. The method of claim 24,
wherein at least one replacement adaptive type sampling waveform frame includes a sampling waveform with a higher Doppler resolution than the search sampling waveform subframe.

31. The radar data acquisition circuit of claim 24,
wherein at least one replacement adaptive type sampling waveform frame includes a sampling waveform having a beamforming sampling waveform subframe.

32. The method of claim 24,
wherein respective extend frames of the sequence of subframes have a time length in a range 100 microseconds to 50 milliseconds.

33. The method of claim 24,
wherein respective extend frames of the sequence of subframes have a time length in a range 100 microseconds to 100 milliseconds.

* * * * *